United States Patent
Kim et al.

(10) Patent No.: US 11,876,176 B2
(45) Date of Patent: Jan. 16, 2024

(54) COPOLYMER HAVING FUNCTIONAL GROUP AS SUBSTITUENT AT CHAIN-END, METHOD FOR PREPARING ELECTROLYTE MEMBRANE FOR SECONDARY BATTERY INCLUDING THE SAME, AND ELECTROLYTE MEMBRANE FOR SECONDARY BATTERY INCLUDING THE SAME

(71) Applicant: Research & Business Foundation Sungkyunkwan University, Suwon-si (KR)

(72) Inventors: Duk Joon Kim, Seoul (KR); Zhenchuan Tian, Suwon-si (KR); Le Mong Anh, Suwon-si (KR); Su Gyeong Kim, Suwon-si (KR); Hae Ryung Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 219 days.

(21) Appl. No.: 17/469,073

(22) Filed: Sep. 8, 2021

(65) Prior Publication Data

US 2022/0093971 A1 Mar. 24, 2022

(30) Foreign Application Priority Data

Sep. 22, 2020 (KR) .................... 10-2020-0121967

(51) Int. Cl.
*H01M 10/0565* (2010.01)
*H01M 10/0525* (2010.01)
*C08G 75/23* (2006.01)

(52) U.S. Cl.
CPC ........ *H01M 10/0565* (2013.01); *C08G 75/23* (2013.01); *H01M 10/0525* (2013.01); *H01M 2300/0082* (2013.01); *H01M 2300/0085* (2013.01)

(58) Field of Classification Search
None
See application file for complete search history.

(56) References Cited

FOREIGN PATENT DOCUMENTS

KR 10-2055265 B1 12/2019

OTHER PUBLICATIONS

Over Anh et al., ACS Appl. Energy Mater., 2019, 2, 2585-2595. (Year: 2019).*
Anh et al., Journal of Power Sources, 2019, 422, 57-64. (Year: 2019).*
Na, Ruiqi, et al., Accepted Manuscript for Journal of Materials Chemistry A, *Royal Society of Chemistry*, www.rsc.org/materialsA, Oct. 22, 2016, (32 pages in English).

* cited by examiner

*Primary Examiner* — Eli S Mekhlin
(74) *Attorney, Agent, or Firm* — NSIP Law

(57) ABSTRACT

Disclosed is a copolymer as PAES-g-PEG or PAEK-g-PEG as an arylene-based polymer having ion conductivity and mechanical strength and having a functional group as a substituent at a chain-end of PEG, wherein the functional group includes one selected from a group consisting of a hydroxyl group (—OH), methacrylate (-MA), a double hydroxyl group (-2OH), a nitrile group (—CN) and an ionic liquid group (-PYRTFSI). Further, disclosed is a solid electrolyte membrane for a secondary battery including the copolymer and thus having improved ion conductivity, lithium ion transport ability, and excellent mechanical strength.

12 Claims, 22 Drawing Sheets

PAES-g-PEG-OH copolymer

PAES-g-PEG-2OH copolymer

PAES-g-PEG-PYRTFSI copolymer

PAES-g-PEG-MA copolymer

PAES-g-PEG-CN copolymer

PAES-g-2(PEG+PYRTFSI) copolymer

COPOLYMER HAVING FUNCTIONAL GROUP AS SUBSTITUENT AT CHAIN-END, METHOD FOR PREPARING ELECTROLYTE MEMBRANE FOR SECONDARY BATTERY INCLUDING THE SAME, AND ELECTROLYTE MEMBRANE FOR SECONDARY BATTERY INCLUDING THE SAME

BACKGROUND

1. Field

The present disclosure relates to a copolymer as PAES-g-PEG or PAEK-g-PEG as an arylene-based polymer having ion conductivity and mechanical strength and having a functional group as a substituent at a chain-end of PEG, and relates to a solid electrolyte membrane for a secondary battery including the copolymer and thus having improved ion conductivity, lithium ion transport ability, and excellent mechanical strength, and to a method for preparing the solid electrolyte membrane.

2. Description of Related Art

Conventional lithium secondary batteries have been widely recognized as excellent energy storage devices due to their high power density and long cycle life. However, an organic liquid electrolyte as one of elements constituting the conventional lithium secondary battery has been subjected to safety issue due to the risk of leakage and explosion. For example, conventional carbonate-based organic liquid electrolytes such as ethylene carbonate (EC) and dimethyl carbonate (DMC) have electrolyte decomposition on a surface of a negative electrode to cause increased interfacial resistance and reduced power density. The conventional carbonate-based organic liquid electrolytes pass through a lithium dendrite separator formed when lithium (Li) metal is used as a negative electrode material, thereby causing fire and explosion due to an internal short circuit.

Currently, solid electrolytes are receiving great attention as an alternative to solving the safety problems of the liquid electrolytes. The solid electrolytes not only solve the problems of the liquid electrolytes, but also provide excellent mechanical properties and high power density. In particular, solid polymer electrolyte exhibits low cost, excellent flexibility, stability with a metal negative electrode, and the like. In order to use the solid polymer electrolyte, following two conditions are required. First, it should have both high lithium ion conductivity and excellent mechanical properties, and second, it should be able to overcome weaker degree of dissociation of lithium salts, compared to the conventional liquid electrolytes.

However, conventional solid polymer electrolytes based on poly(ethylene oxide) (PEO) may significantly reduce conductivity. This is because PEO is a semi-crystalline material, and thus high crystallinity of PEO reduces conductivity. Specifically, for example, crystallinity of poly(ethylene glycol) (PEG) homopolymer is 96.4%. Mobility of lithium ions in a PEG crystal phase is almost zero, compared to that in a PEG amorphous phase. Because a crystal lattice structure of the polymer hinders the movement of lithium cations, the polymer exhibits low ionic conductivity (about $10^{-6}$ S cm$^{-1}$). In addition, due to a low dielectric constant of PEG, it may be difficult for PEG to dissociate the lithium salt such that ion aggregates may be formed. The ion aggregates are large in size and have very little migration compared to free lithium cations, resulting in low lithium ion conductivity and low lithium ion transport ability. In this connection, in the solid polymer electrolyte, lithium cations move based on a hopping mechanism through an ether group in a polymer chain. In order to increase the dissociation of lithium salts, it is necessary to increase the dielectric constant to reduce a Jerome length and lower a coulombic energy. In order to exhibit such high lithium ion conductivity, both of increase in the number of lithium ions that can move (dissociated ion pairs) and increase in mobility are required.

In general, a structure of polymers such as blending polymers, block copolymers, and graft copolymers may lower a glass transition temperature to increase segmentation motion such that the movement of lithium cations may be promoted. Various physical approaches (plasticizers, inorganic fillers, polymer blending) and various chemical approaches (copolymerization, crosslinking, introduction of ionic side chains) may inhibit crystallization. However, with the introduction of the plasticizers, lithium ion conductivity may be improved, but mechanical strength which tends to be inversely proportional to the lithium ion conductivity may be lowered. Among the various approaches, block or graft copolymers that may exhibit moderate mechanical strength and lithium ion conductivity are receiving great attention. This copolymer has a distinctly phase-separated form, so that one component of the copolymer may provide high ionic conductivity of a membrane, while the other component thereof may provide excellent mechanical strength independently from one component of the copolymer.

That is, in order to maintain the mechanical strength of the solid polymer electrolyte in an all-solid-state battery currently being developed, the ionic conductivity thereof is significantly lower than that of the liquid electrolyte. The conventional solid polymer electrolytes based on poly(ethylene oxide) (PEO) have the low dielectric constant, which reduces the dissociation of lithium salts, thereby reducing the number of free lithium ions. Further, the conventional solid polymer electrolytes based on poly(ethylene oxide) (PEO) have a higher crystallinity, such that the ion conductivity and lithium ion transport ability are reduced, so that the performance of the all-solid-state battery is deteriorated.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a novel copolymer as PAES-g-PEG or PAEK-g-PEG compound as polymerized by grafting PEG to a PAES or PAEK main chain in which PEG has various functional groups as a substituent at a chain-end of PEG.

Another purpose of the present disclosure is to provide an electrolyte membrane for a secondary battery that includes the copolymer according to the present disclosure and thus is thermally/mechanically stable and has excellent ionic conductivity and discharge capacity, thereby overcoming inherent low ionic conductivity, low dielectric constant, and low charge/discharge cycle performance of the solid electrolyte.

Still another purpose of the present disclosure is to provide a method for preparing the electrolyte membrane including the copolymer according to the present disclosure.

A first aspect of the present disclosure provides a copolymer comprising a compound selected from a group consisting of compounds respectively represented by following Chemical Formulas 1-1 to 1-4; and a functional group as a substituent at a chain-end of the compound, wherein the functional group includes one selected from a group consisting of a hydroxyl group (—OH), methacrylate (-MA), a double hydroxyl group (-2OH), a nitrile group (—CN) and an ionic liquid group (-PYRTFSI):

[Chemical Formula 1-1]

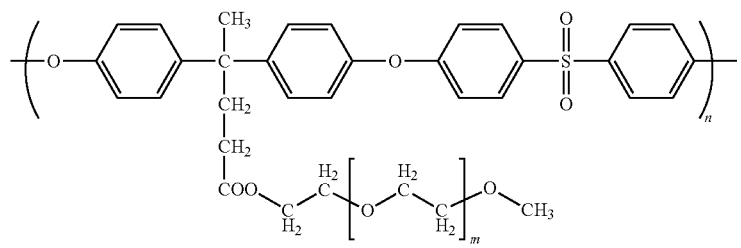

[Chemical Formula 1-2]

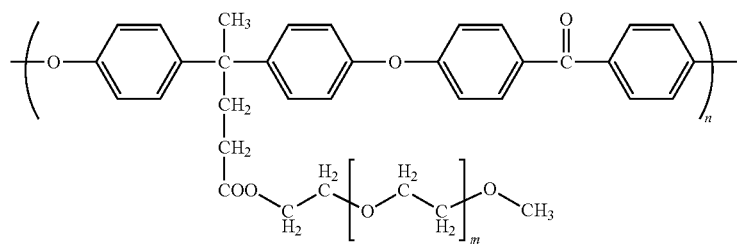

[Chemical Formula 1-3]

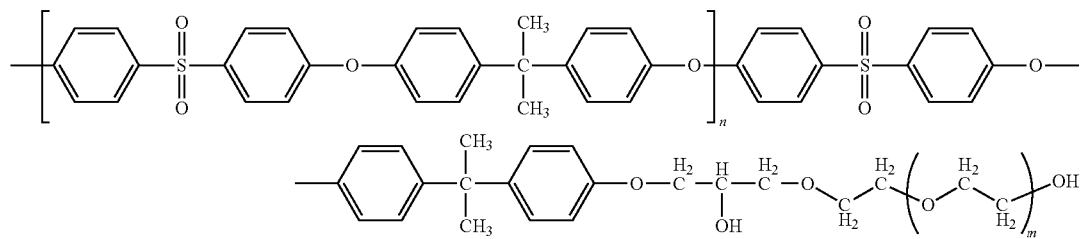

[Chemical Formula 1-4]

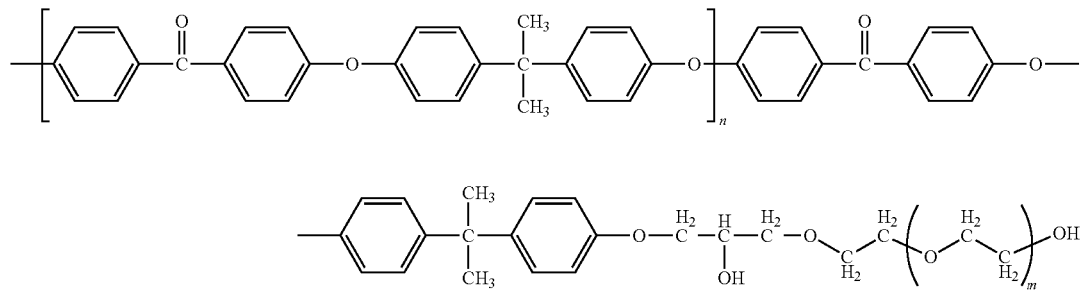

wherein in each of the Chemical Formulas 1-1 to 1-4, each of m and n independently represents an integer of 1 or greater.

In an embodiment, when the functional group is the hydroxyl group (—OH), the copolymer is represented by one selected from a group consisting of following Chemical Formulas 2-1 to 2-4:

[Chemical Formula 2-1]

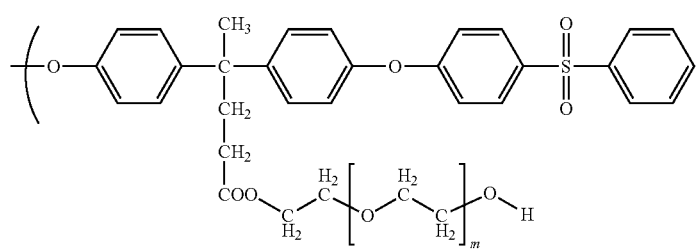

[Chemical Formula 2-2]

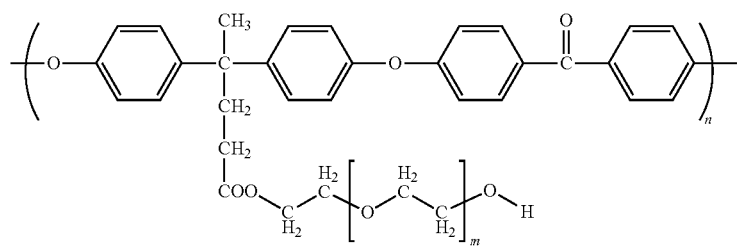

[Chemical Formula 2-3]

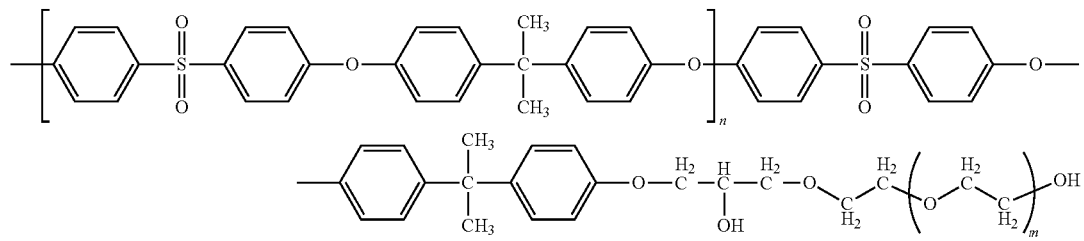

[Chemical Formula 2-4]

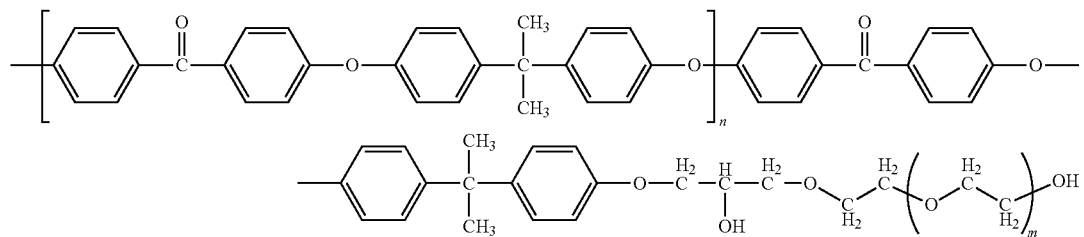

wherein in each of the Chemical Formulas 2-1 to 2-4, each of m and n independently represents an integer of 1 or greater.

In one embodiment of the first aspect, when the functional group is the methacrylate (-MA), the copolymer is represented by one selected from a group consisting of following Chemical Formulas 3-1 to 3-4:

[Chemical Formula 3-1]

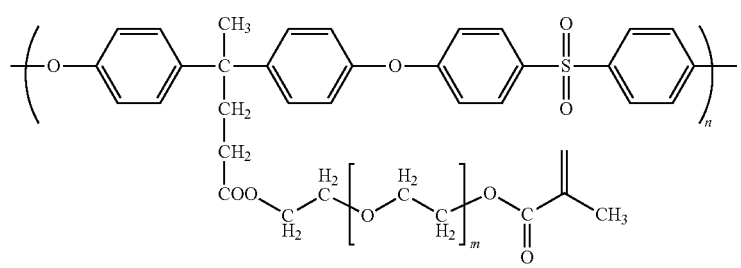

[Chemical Formula 3-2]

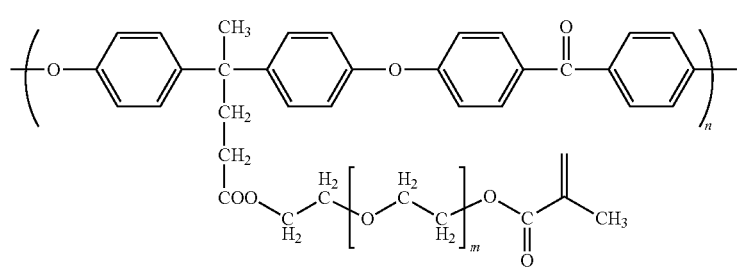

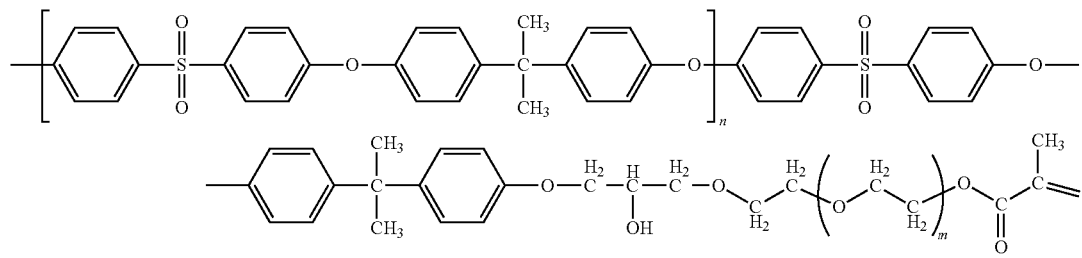

[Chemical Formula 3-3]

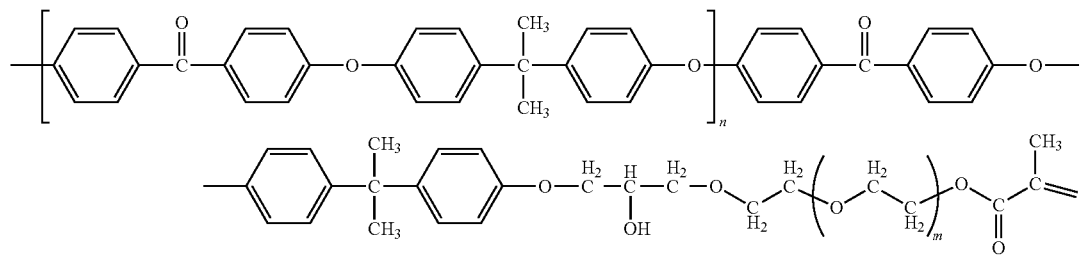

[Chemical Formula 3-4]

wherein in each of the Chemical Formulas 3-1 to 3-4, each of m and n independently represents an integer of 1 or greater.

In one embodiment of the first aspect, when the functional group is the double hydroxyl group (-2OH), the copolymer is represented by one selected from a group consisting of following Chemical Formulas 4-1 to 4-4:

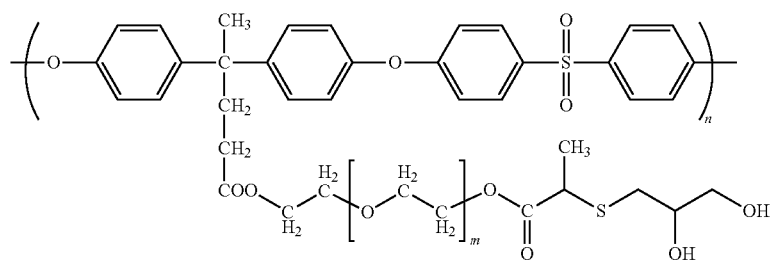

[Chemical Formula 4-1]

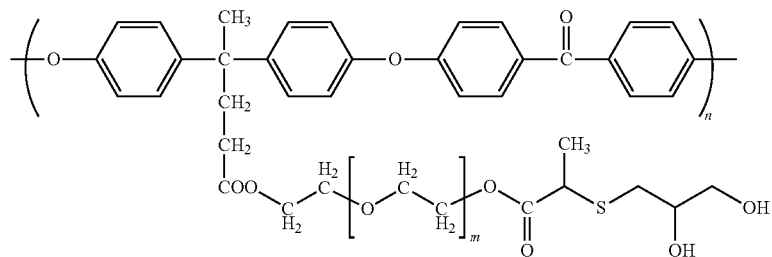

[Chemical Formula 4-2]

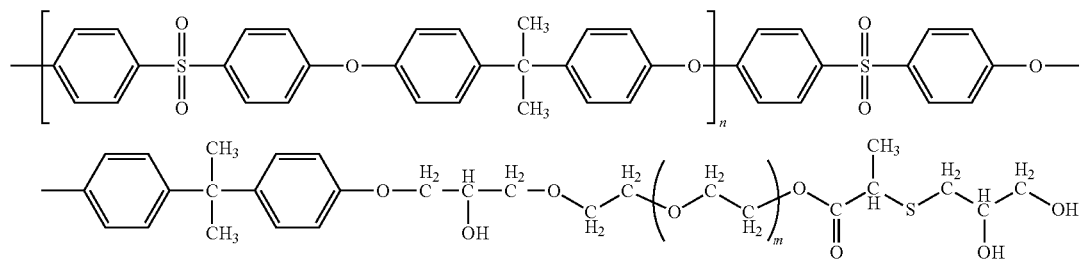

[Chemical Formula 4-3]

[Chemical Formula 4-4]

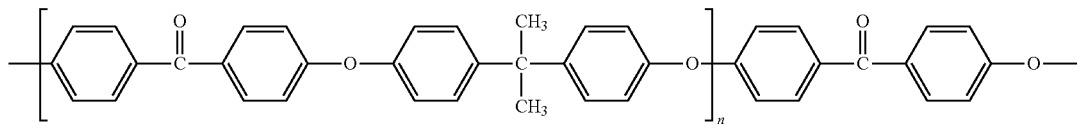

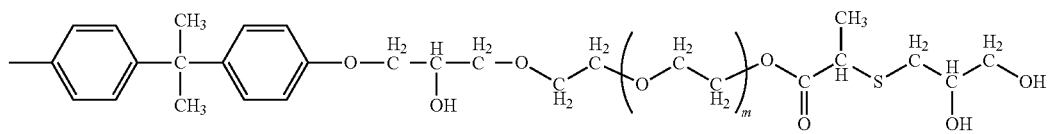

wherein in each of the Chemical Formulas 4-1 to 4-4, each of m and n independently represents an integer of 1 or greater.

In one embodiment of the first aspect, when the functional group is the nitrile group (—CN), the copolymer is represented by one selected from a group consisting of following Chemical Formulas 5-1 to 5-4:

wherein in each of the Chemical Formulas 5-1 to 5-4, each of m and n independently represents an integer of 1 or greater.

In one embodiment of the aspect, when the functional group is an ionic liquid group (-PYRTFSI), the copolymer is represented by one selected from a group consisting of following Chemical Formulas 6-1 to 6-4:

[Chemical Formula 5-1]

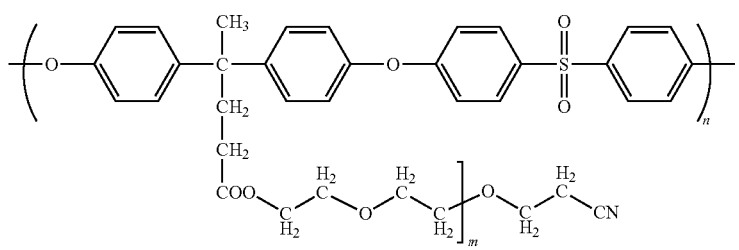

[Chemical Formula 5-2]

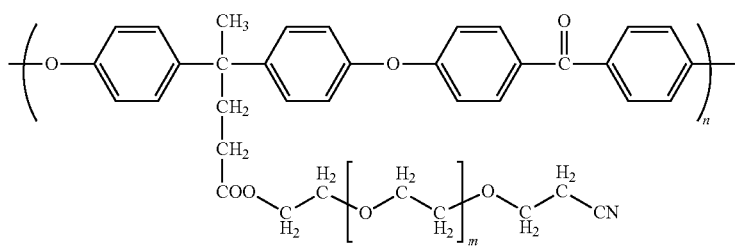

[Chemical Formula 5-3]

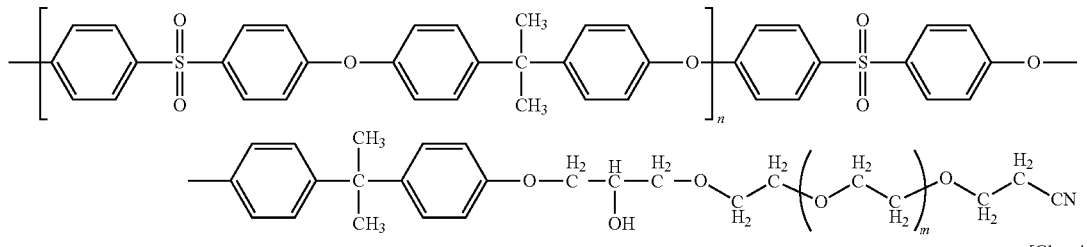

[Chemical Formula 5-4]

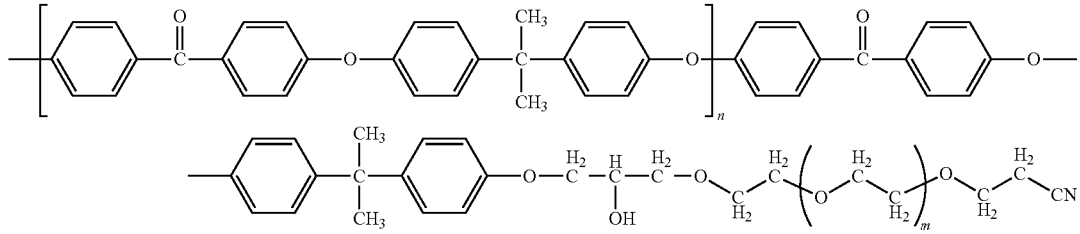

[Chemical Formula 6-1]

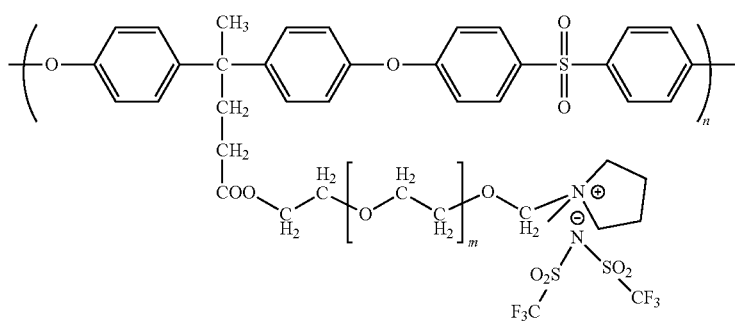

[Chemical Formula 6-2]

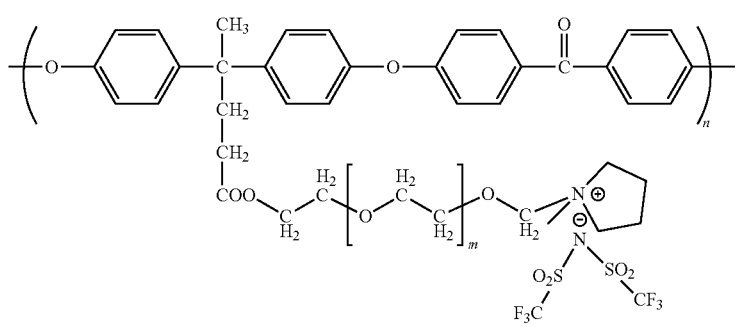

[Chemical Formula 6-3]

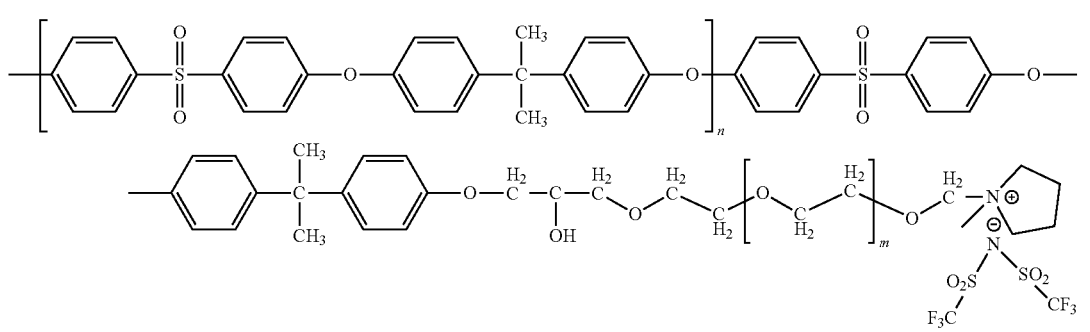

[Chemical Formula 6-4]

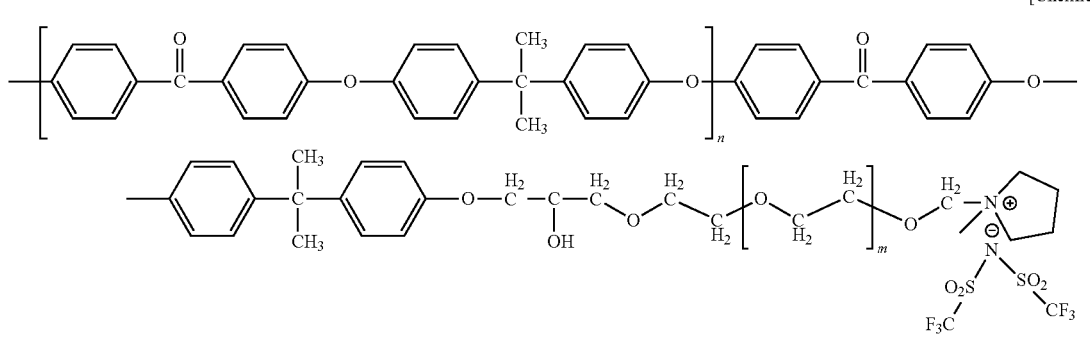

wherein in each of the Chemical Formulas 6-1 to 6-4, each of m and n independently represents an integer of 1 or greater.

A second aspect of the present disclosure provides an electrolyte membrane for a secondary battery, wherein the electrolyte membrane includes the copolymer as defined above and an ionic liquid.

In one embodiment of the second aspect, the ionic liquid includes one selected from a group consisting of PYR14-TFSI, EMI-TFSI, EMI-BF4, EMI-FSI, MPP-TFSI, MBP-TFSI, and BMI-TFSI.

In one embodiment of the second aspect, a weight percentage of the ionic liquid is in a range of 40 to 70% of a total weight of the membrane.

A third aspect of the present disclosure provides a method for preparing an electrolyte membrane for a secondary battery, wherein the method comprises: a first step of preparing the copolymer including the compound selected from a group consisting of compounds respectively represented by the above Chemical Formulas 1-1 to 1-4; and the functional group as a substituent at a chain-end of the compound, wherein the functional group includes one selected from a group consisting of a hydroxyl group (—OH), methacrylate (-MA), a double hydroxyl group (-2OH), a nitrile group (—CN) and an ionic liquid group (-PYRTFSI); a second step of dissolving the copolymer and an ionic liquid in a solvent to prepare a mixed solution; and a third step of casting and drying the mixed solution.

In one embodiment of the third aspect, the ionic liquid includes one selected from a group consisting of PYR14-TFSI, EMI-TFSI, EMI-BF4, EMI-FSI, MPP-TFSI, MBP-TFSI, and BMI-TFSI.

In one embodiment of the third aspect, the organic solvent may be tetrahydrofuran.

In one embodiment of the third aspect, the second step may be carried out such that a weight percentage of the ionic liquid is in a range of 40 to 70% of a total weight of the membrane.

Effects of the present disclosure may be as follows but may not be limited thereto.

In accordance with the present disclosure, the copolymer having the various functional groups as the substituent as the chain-end of PEG of PAES-g-PEG or PAEK-g-PEG is used as a material of a solid electrolyte. Thus, the dielectric constant of an environment in which ions are transported may be improved due to a dipole moment enhanced by the functional group, and the crystallinity of the PEG phase may be decreased to increase the movement of ions. Further, since an interfacial resistance of the membrane with the electrode is reduced, the electrochemical performance of the all-solid-state battery system may be improved. In addition, the various functional groups may promote the dissociation of lithium salts to improve ionic conductivity, such that the secondary battery including the solid electrolyte membrane according to the present disclosure may have an excellent discharge capacity.

In addition to the effects as described above, specific effects of the present disclosure will be described together with the detailed description for carrying out the disclosure.

BRIEF DESCRIPTION OF DRAWINGS

In FIG. 3, PAES-g-PEGMA-2OH means the same copolymer as PAES-g-PEG-2OH.

In FIG. 4, PAES-g-PEGMA-2OH means the same copolymer as PAES-g-PEG-2OH.

In FIG. 5, PAES-g-PEGMA-2OH means the same copolymer as PAES-g-PEG-2OH.

DETAILED DESCRIPTIONS

Descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Copolymer Having Functional Group as Substituent at Chain-End Thereof

Figure 1:
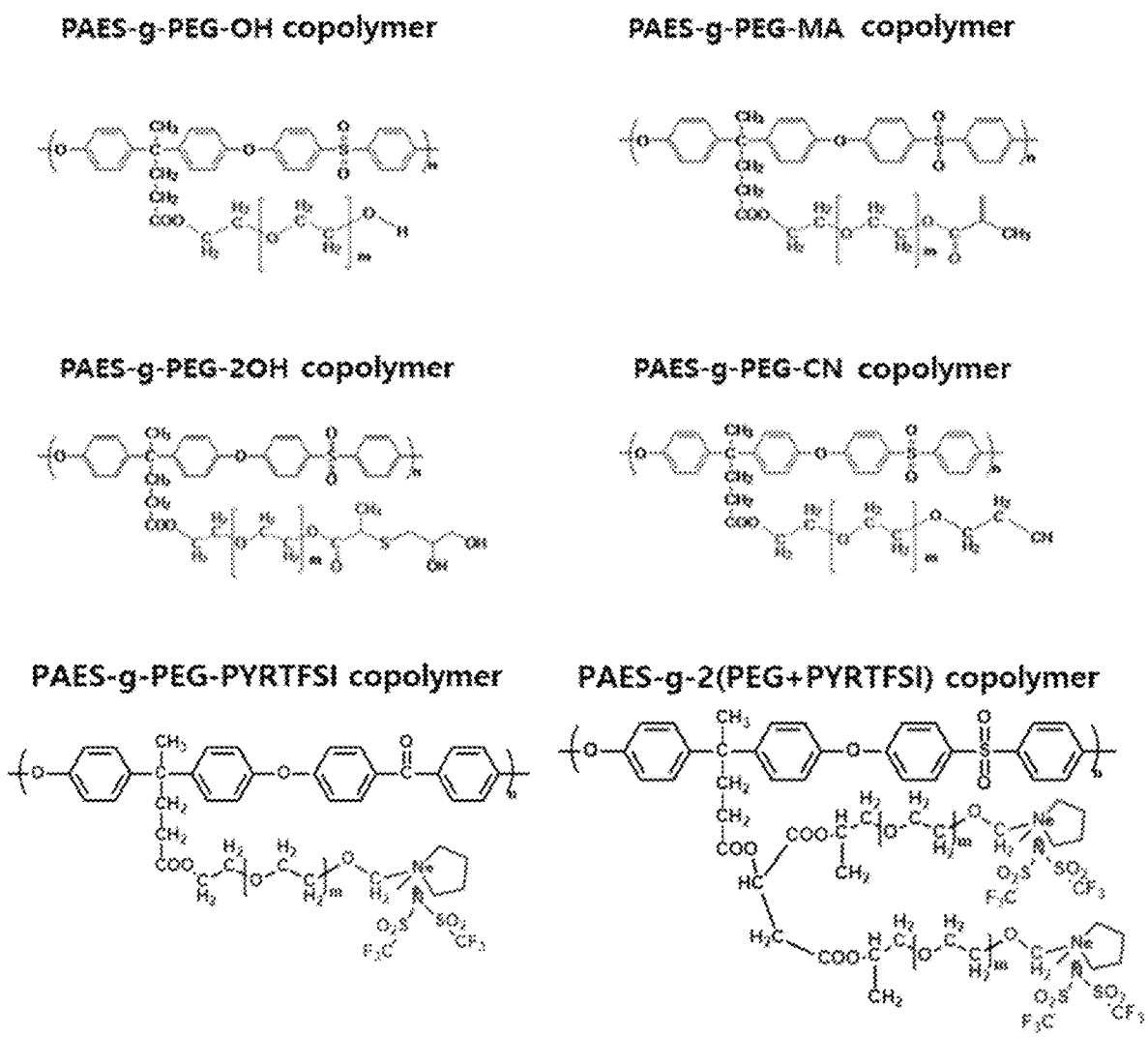
FIG. 1 is a diagram showing a copolymer having a functional group as a substituent at a chain-end thereof according to an embodiment of the present disclosure.

FIG. 1 is a diagram showing a copolymer having a functional group as a substituent at a chain-end thereof according to an embodiment of the present disclosure.

Referring to FIG. 1, the copolymer comprises a compound selected from a group consisting of compounds respectively represented by following Chemical Formulas 1-1 to 1-4; and a functional group as a substituent at a chain-end of the compound:

[Chemical Formula 1-1]

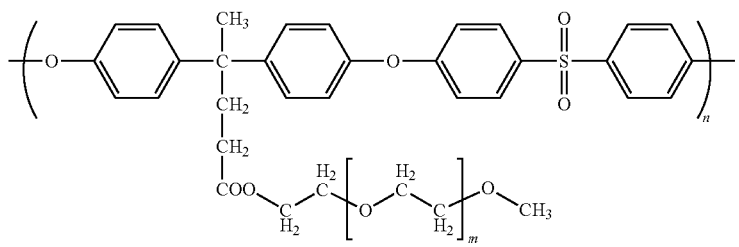

[Chemical Formula 1-2]

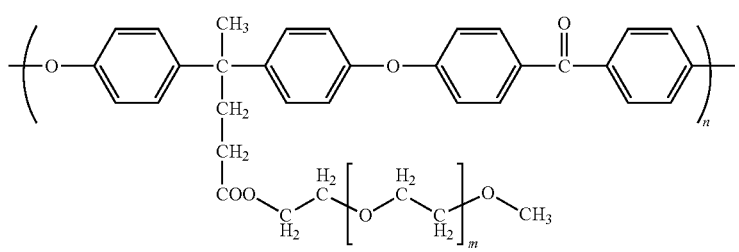

[Chemical Formula 1-3]

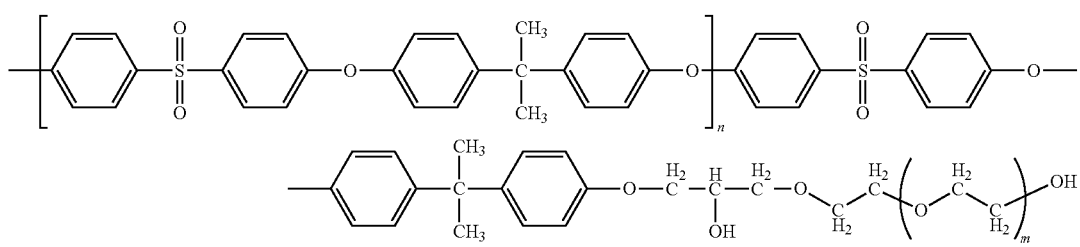

[Chemical Formula 1-4]

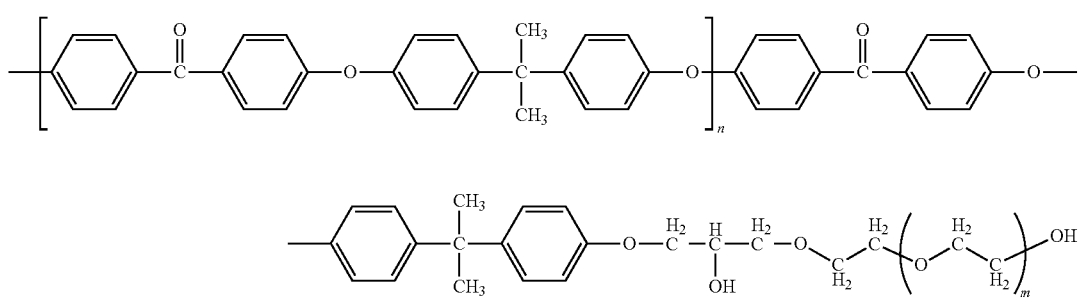

wherein in each of the Chemical Formulas 1-1 to 1-4, each of m and n independently represents an integer of 1 or greater. Preferably, in each of the Chemical Formulas 1-1 to 1-4, m may be an integer of 45 to 90, and n may be an integer of 50 to 70.

Each of the compounds represented by the Chemical Formulas 1-1 to 1-4 may include poly(arylene ether sulfone) (hereinafter referred to as PAES) or poly(arylene ether ketone) (hereinafter referred to as PAEK), and polyethylene glycol (hereinafter, referred to as PEG) bonded thereto.

In the compounds represented by the Chemical Formulas 1-1 and 1-2, the bonding between PAES or PAEK and PEG may be achieved via graft polymerization as a method of adding a further polymer to a main chain polymer. Specifically, each of the compounds represented by Chemical Formulas 1-1 to 1-4 may include each of PAES and PAEK as the main chain, and may be prepared by reacting COOH of each of PAES and PAEK with OH of PEG and thus grafting PEG to each of PAES and PAEK.

Specifically, the compound represented by the Chemical Formula 1 may be a copolymer in which PEG is grafted onto PAES. The compound represented by the Chemical Formula 2 may be a copolymer in which PEG is grafted to PAEK.

In one example, each of the compounds represented by the Chemical Formulas 1-3 and 1-4 may be a block copolymer of each of PAES and PAEK, and PEG.

The block copolymer consists of two or more chemically distinct polymer blocks covalently bonded together. In each of the compounds represented by the Chemical Formulas 1-3 and 1-4, a first chemically distinct polymer block may be each of a block of repeated PAES monomers and a block of repeated PAEK monomers. A second chemically distinct polymer block may be a block of repeated PEG monomers.

The functional group is present as a substituent at the chain-end of PEG of the compound represented by each of the Chemical Formulas 1-1 to 1-4. The functional group includes one selected from a group consisting of a hydroxyl group (—OH), methacrylate (-MA), a double hydroxyl group (-2OH), a nitrile group (—CN) and an ionic liquid group (-PYRTFSI).

In an embodiment, when the functional group is the hydroxyl group (—OH), the copolymer is represented by one selected from a group consisting of following Chemical Formulas 2-1 to 2-4:

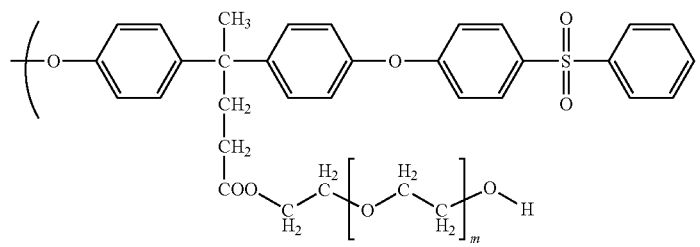

[Chemical Formula 2-1]

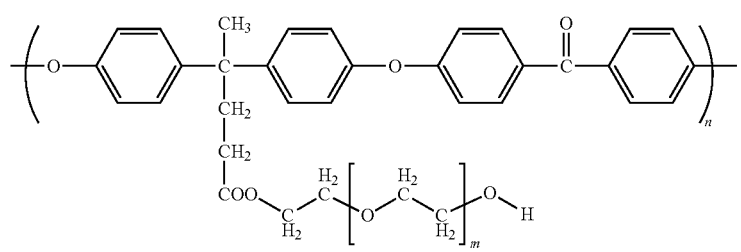

[Chemical Formula 2-2]

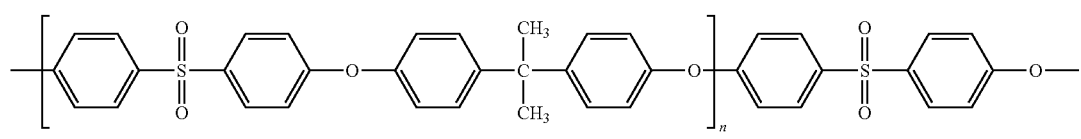
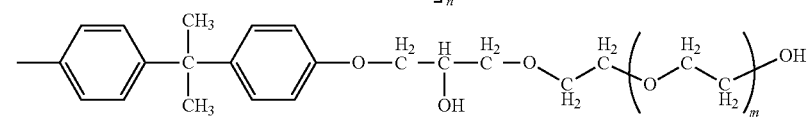

[Chemical Formula 2-3]

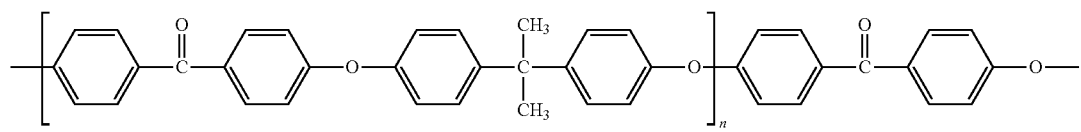
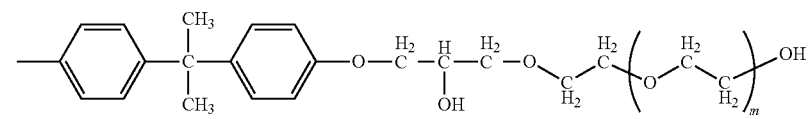

[Chemical Formula 2-4]

wherein in each of the Chemical Formulas 2-1 to 2-4, each of m and n independently represents an integer of 1 or greater.

In one embodiment, when the functional group is the methacrylate (-MA), the copolymer is represented by one selected from a group consisting of following Chemical Formulas 3-1 to 3-4:

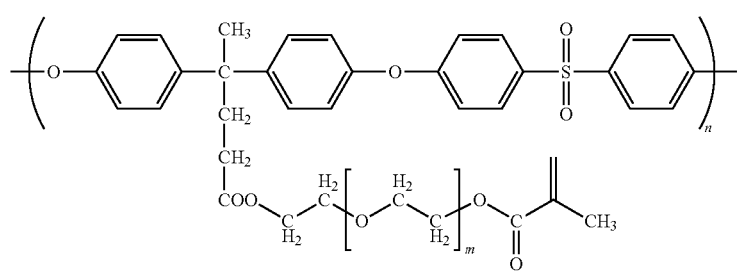

[Chemical Formula 3-1]

-continued

[Chemical Formula 3-2]

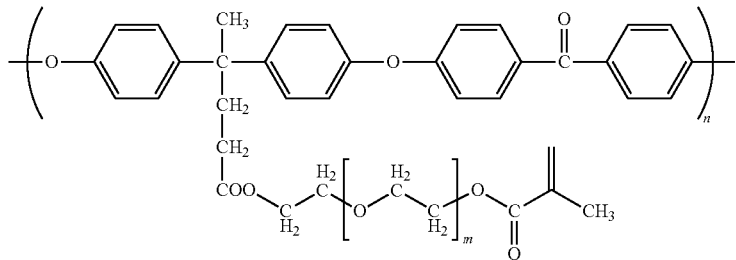

[Chemical Formula 3-3]

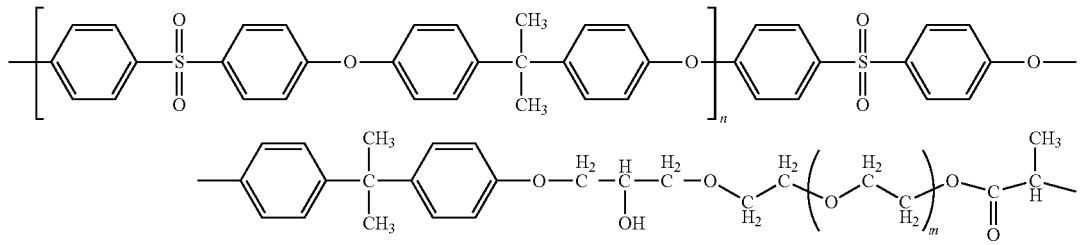

[Chemical Formula 3-4]

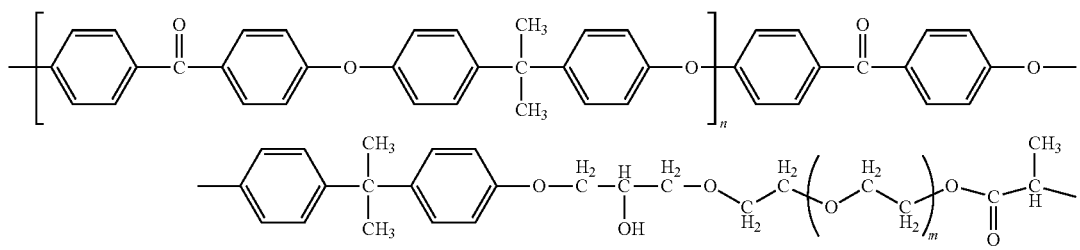

wherein in each of the Chemical Formulas 3-1 to 3-4, each of m and n independently represents an integer of 1 or greater.

In one embodiment, when the functional group is the double hydroxyl group (-2OH), the copolymer is represented by one selected from a group consisting of following Chemical Formulas 4-1 to 4-4:

[Chemical Formula 4-1]

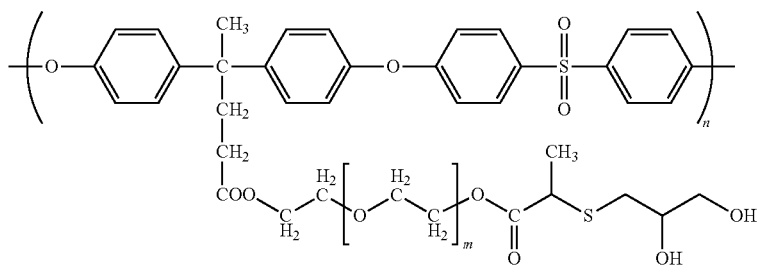

[Chemical Formula 4-2]

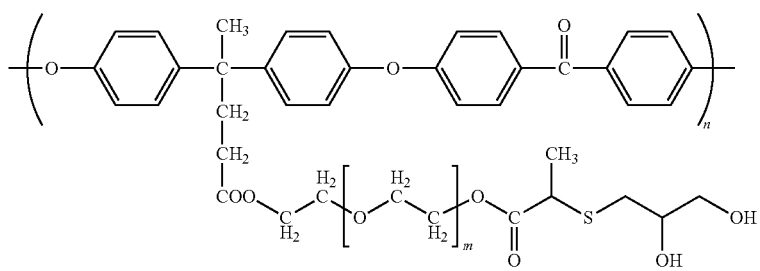

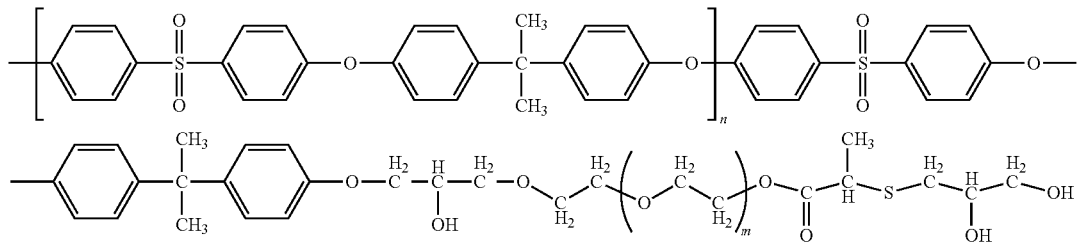

[Chemical Formula 4-3]

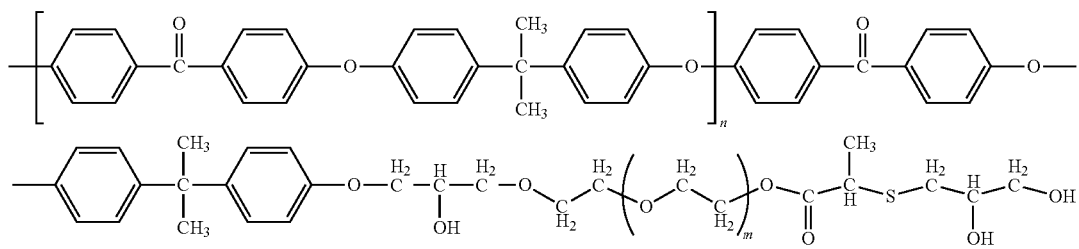

[Chemical Formula 4-4]

wherein in each of the Chemical Formulas 4-1 to 4-4, each of m and n independently represents an integer of 1 or greater.

In one embodiment, when the functional group is the nitrile group (—CN), the copolymer is represented by one selected from a group consisting of following Chemical Formulas 5-1 to 5-4:

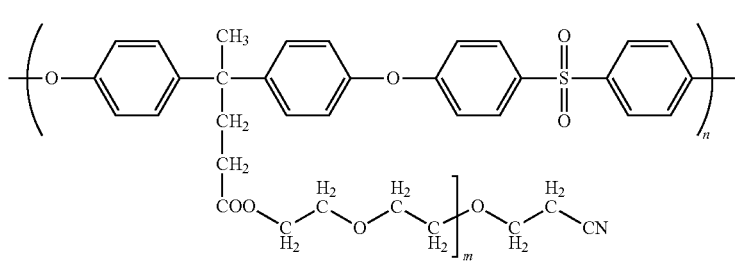

[Chemical Formula 5-1]

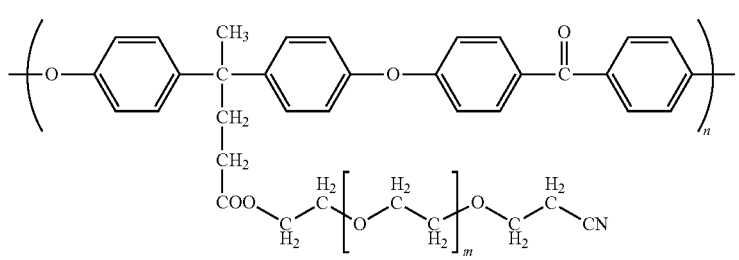

[Chemical Formula 5-2]

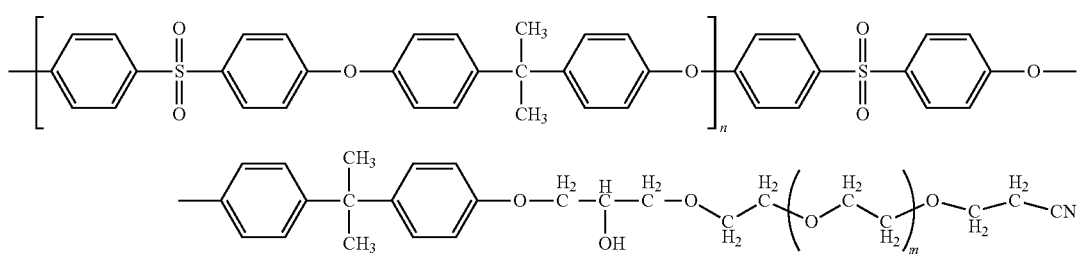

[Chemical Formula 5-3]

[Chemical Formula 5-4]

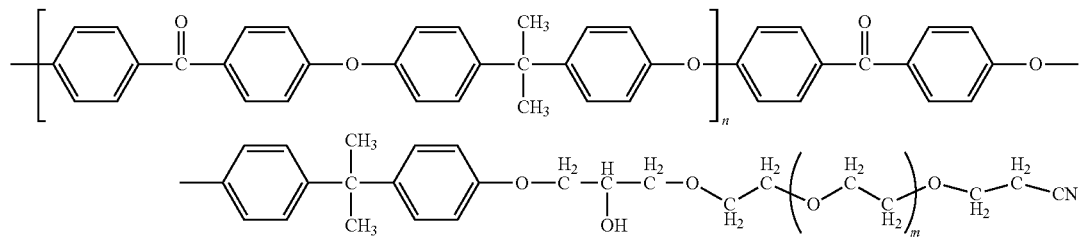

wherein in each of the Chemical Formulas 5-1 to 5-4, each of m and n independently represents an integer of 1 or greater.

In one embodiment, when the functional group is the ionic liquid group (-PYRTFSI), the copolymer is represented by one selected from a group consisting of following Chemical Formulas 6-1 to 6-4:

[Chemical Formula 6-1]

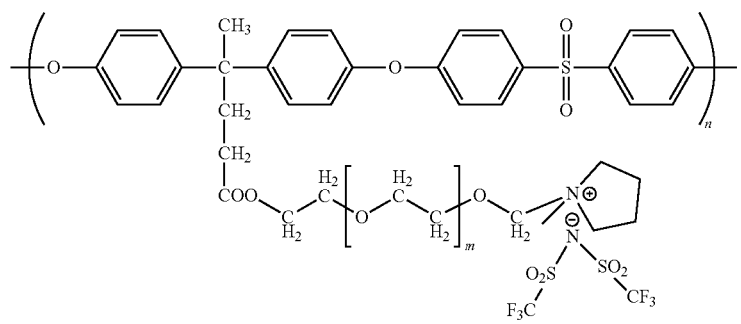

[Chemical Formula 6-2]

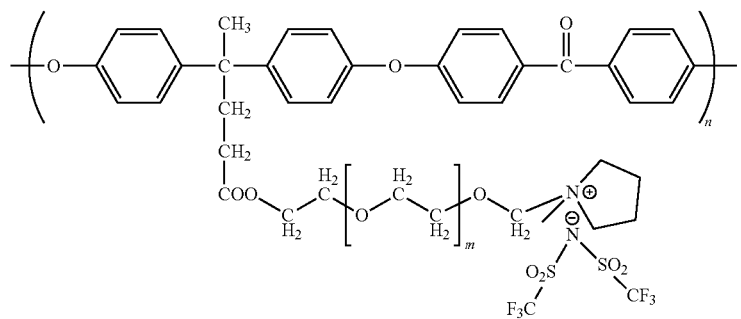

[Chemical Formula 6-3]

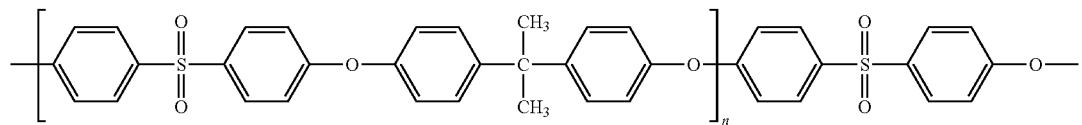

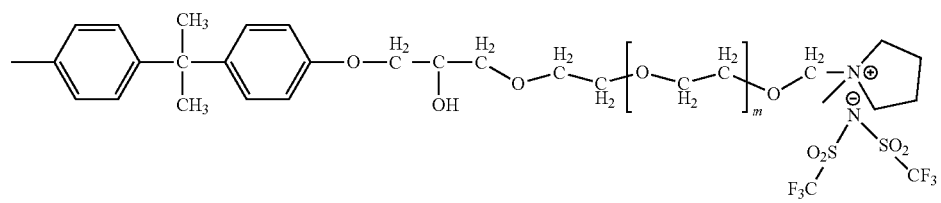

[Chemical Formula 6-4]

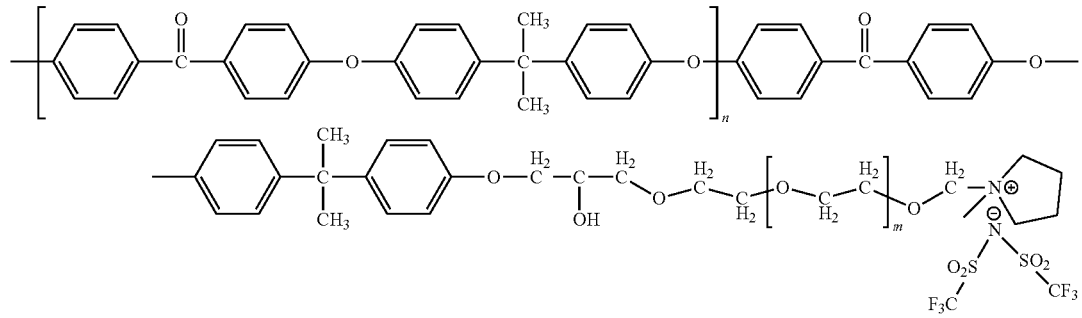

wherein in each of the Chemical Formulas 6-1 to 6-4, each of m and n independently represents an integer of 1 or greater.

As each of the copolymers according to the present disclosure has a distinctly phase-separated form, each of the components constituting each of the copolymers may independently provide each corresponding property.

Electrolyte Membrane for Secondary Battery and Method for Preparing the Same

An electrolyte membrane for a secondary battery according to the present disclosure and a method for preparing the same is characterized in that the electrolyte membrane includes the copolymer having the functional group as a substituent at the chain-end thereof according to the present disclosure.

First, the electrolyte membrane for a secondary battery according to the present disclosure includes a copolymer, and an ionic liquid, wherein the copolymer includes a compound selected from a group consisting of compounds respectively represented by following Chemical Formulas 1-1 to 1-4; and a functional group as a substituent at a chain-end of the compound, wherein the functional group includes one selected from a group consisting of a hydroxyl group (—OH), methacrylate (-MA), a double hydroxyl group (-2OH), a nitrile group (—CN) and an ionic liquid group (-PYRTFSI):

[Chemical Formula 1-1]

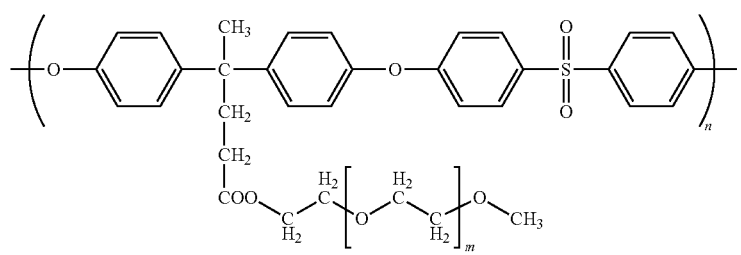

[Chemical Formula 1-2]

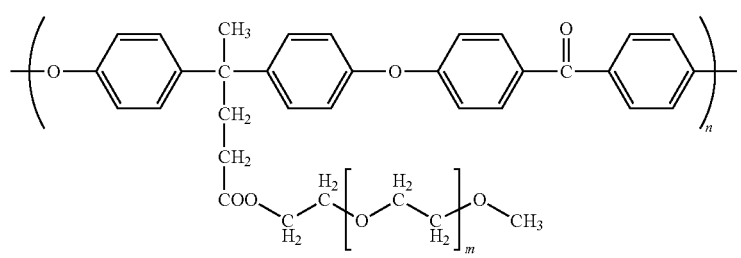

[Chemical Formula 1-3]

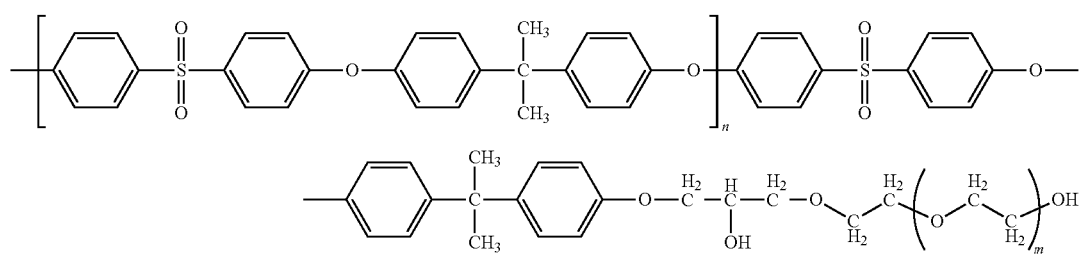

[Chemical Formula 1-4]

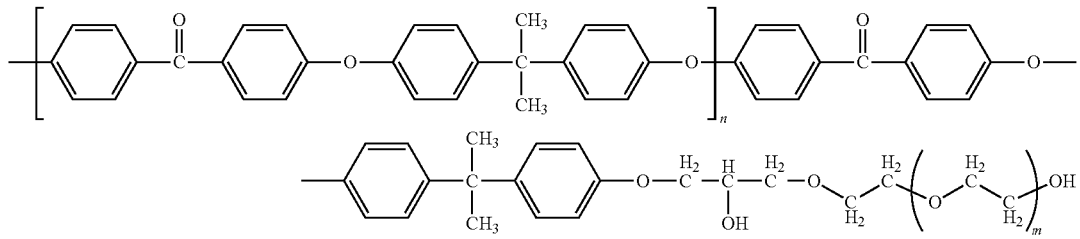

wherein in each of the Chemical Formulas 1-1 to 1-4, each of m and n independently represents an integer of 1 or greater.

Appropriate phase separation between PAES or PAEK and a PEG side chain in the copolymer may be induced by the ionic liquid. Accordingly, each of the components constituting the copolymer may independently provide following characteristics.

Specifically, the PAES or PAEK main chain of the copolymer is composed of a hard aromatic polymer. Thus, when the copolymer is introduced into the secondary battery, the main chain may provide excellent thermal and chemical stability and may provide the mechanical strength withstanding against the volume change of the active material and the conductive agent during the discharge process. Further, the PEG side chain having the functional group as a substituent at the chain-end may promote the dissociation of the lithium salt, thereby increasing the transport of lithium ions.

The ionic liquid may be a substance capable of interacting with the PEG. The ionic liquid may form a lithium ion transport channel due to the interaction with the PEG, which in turn may improve the ionic conductivity of the electrolyte membrane. In one example, the ionic liquid may include one selected from a group consisting of PYR14-TFSI(1-Butyl-1-methylpyrrolidinium bis(trifluoromethylsulfonyl)imide), EMI-TFSI(1-Ethyl-3-methylimidazolium bis-(trifluoromethylsulfonyl)-imide), EMI-BF4(1-Ethyl-3-methyl-1H-imidazol-3-ium tetrafluoroborate), EMI-FSI(1-Ethyl-3-methylimidazolium Bis(fluorosulfonyl)imide), MPP-TFSI((1-methyl-1-propyl-pyrrolidinium bis (trifluoromethanesulfonyl)imide)), MBP-TFSI(1-methyl-1-buthylpeperidinium bis(trifluoromethylsulfonyl)imide), and BMI-TFSI (1-Butyl-3-methylimidazolium bis(trifluoromethylsulfonyl)imide). Preferably, the ionic liquid may be PYR14-TFSI. PYR14-TFSI may have good conductivity and chemical stability, and may be a material capable of good interaction with PEG.

In one embodiment, as the weight percentage of the ionic liquid increases, the degree of crystallinity of the PEG chain may be reduced, so that lithium ions may more easily move. Therefore, preferably, the ionic liquid may have a weight percentage of about 40 to 70% based on the total weight of the electrolyte membrane.

The method for preparing an electrolyte membrane for a secondary battery may include a first step of preparing a copolymer, wherein the copolymer includes a compound selected from a group consisting of compounds respectively represented by following Chemical Formulas 1-1 to 1-4; and a functional group as a substituent at a chain-end of the compound, wherein the functional group includes one selected from a group consisting of a hydroxyl group (—OH), methacrylate (-MA), a double hydroxyl group (-2OH), a nitrile group (—CN) and an ionic liquid group (-PYRTFSI); a second step of dissolving the copolymer and an ionic liquid in a solvent to prepare a mixed solution; and a third step of casting and drying the mixed solution:

[Chemical Formula 1-1]

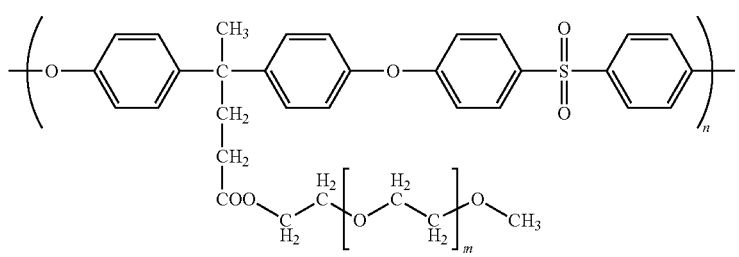

[Chemical Formula 1-2]

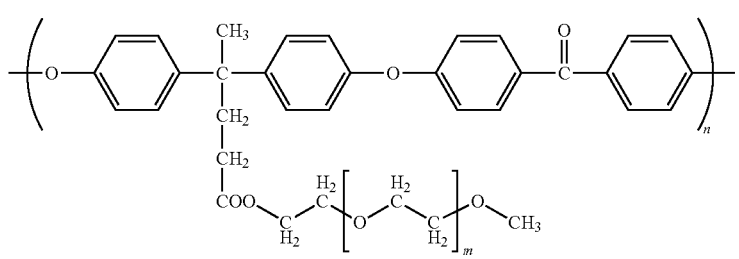

[Chemical Formula 1-3]

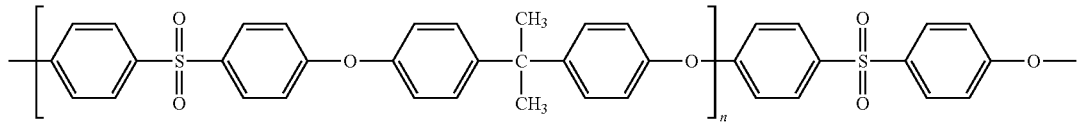

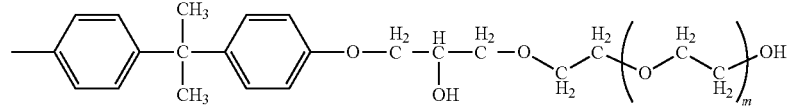

[Chemical Formula 1-4]

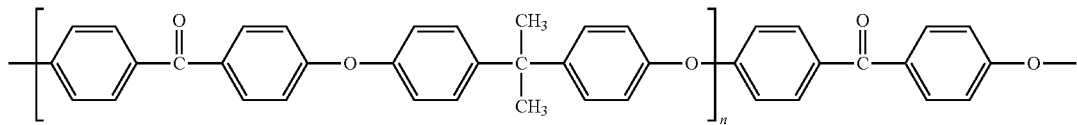

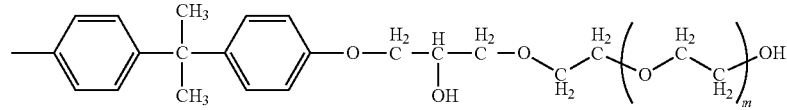

wherein in each of the Chemical Formulas 1-1 to 1-4, each of m and n independently represents an integer of 1 or greater.

In the first step, the compound may be a polymer material in a form of a block copolymer between PAES or PAEK and PEG, or a graft copolymer in which the PEG side change is grafted to the PAES or PAEK as the main chain.

In the second step, a solvent capable of dissolving the compound and the ionic liquid may be used as the organic solvent. For example, the organic solvent may be tetrahydrofuran (THF).

The ionic liquid may be a material that interacts with the PEG of the compound to form a lithium ion transport channel. The ionic liquid may include one selected from a group consisting of PYR14-TFSI, EMI-TFSI, EMI-BF4, EMI-FSI, MPP-TFSI, MBP-TFSI, and BMI-TFSI. Preferably, the ionic liquid may be PYR14-TFSI.

In one embodiment, when the ionic liquid is added at a weight percentage smaller than 40% of the total weight of the electrolyte membrane, the segmentation motion of the PEG chain may be lowered due to high crystallinity, such that the number of movable lithium ions is reduced. When the ionic liquid is added in an amount exceeding 70% by weight based on the total weight of the electrolyte membrane, an amount of an amorphous portion increases due to an excess of the ionic liquid, such that the mechanical strength of the membrane is rapidly reduced. Therefore, the ionic liquid may be added at a weight percentage of 40 to 70% based on the total weight of the membrane.

Hereinafter, the copolymer as PAES-g-PEG or PAEK-g-PEG compound in which PEG has various functional groups as a substituent at a chain-end of PEG, the electrolyte membrane for a secondary battery that includes the copolymer, and the method for preparing the membrane will be described in more detail based on specific examples and comparative examples. However, the examples of the present disclosure are only some embodiments of the present disclosure, and thus the scope of the present disclosure is not limited to the following examples.

Example 1

Synthesis of Copolymer

Synthesis of Each of PAES and PAEK Main Chains

PAES-COOH main chain polymer was synthesized using 4,4-bis(4-hydroxyphenyl) valeric acid (HVC, 95%), bis(4-fluorophenyl) sulfone (FS, 99%), potassium carbonate ($K_2CO_3$) and toluene as a solvent, and dimethyl sulfoxide (DMSO).

PAEK-COOH main chain polymer was synthesized using 4,4-bis(4-hydroxyphenyl) valeric acid (HVC, 95%), 4,4-difluorobenzophenone (DBP), potassium carbonate ($K_2CO_3$) and toluene as a solvent, and dimethyl sulfoxide (DMSO).

Example 1-1

Synthesis of PAES-g-PEG-OH Copolymer Having Hydroxyl Group (—OH) at Chain-End Thereof A PAES-g-PEG-OH copolymer having a hydroxyl group (—OH) at a chain-end thereof was synthesized using PAES, poly(ethylene glycol: PEG) having a structure of HO-PEG-OH, N,N'-dicyclohexylcarbodiimide (DCC) as a catalyst, 4-dimethylaminopyridine (DMAP) as a catalyst and dimethylformamide (DMF) as a solvent.

Example 1-2

Synthesis of PAES-g-PEG-MA Copolymer With Methacrylate Group (-MA) at Chain-End Thereof After preparing a first solution in which PAES-g-PEG and 4-dimethylaminopyridine (DMAP) were dissolved in toluene as a solvent, we slowly dropped a second solution in which methacrylate was dissolved in anhydrous toluene as a solvent into the first solution to prepare a mixed solution. Then, the mixed solution was stirred at 0° C. for 5 hours and was subjected to precipitation in diethyl ether to finally synthesize a PAES-g-PEG-MA copolymer having a methacrylate group (-MA) at a chain-end thereof.

Example 1-3

Synthesis of PAES-g-PEGMA-2OH Copolymer With Double Hydroxyl Group (-2OH) at Chain-End Thereof After preparing a first solution in which thioglycerol and azobisisobutyronitrile (AIBN) were dissolved in toluene as a solvent, we slowly dropped a second solution in which PAES-g-PEGMA was dissolved in anhydrous toluene as a solvent to prepare a mixed solution. Thereafter, the mixed solution was stirred at 0° C. for 5 hours and was subjected to precipitation in diethyl ether to synthesize a PAES-g-PEGMA-2OH copolymer having a double hydroxyl group (-2OH) at a chain-end thereof.

Example 1-4

Synthesis of PAES-g-PEG-CN Copolymer Having Nitrile Group (—CN) at Chain-End

After preparing a first solution in which acrylonitrile and HO-PEG-OH were dissolved in toluene as a solvent, a second solution in which sodium hydride (NaH) was dissolved in anhydrous toluene as a solvent was slowly dropped into the first solution to prepare a mixed solution. Thereafter, the mixed solution was stirred at 0° C. for 5 hours, and was subjected to precipitation in diethyl ether to synthesize HO-PEG-CN.

Then, PAES and HO-PEG-CN reacted with each other using catalysts, that is, N,N'-dicyclohexylcarbodiimide (DCC), and 4-dimethylaminopyridine (DMAP) and a solvent, that is, dimethylformamide (DMF). Thus, a PAES-g-PEG-CN copolymer having a nitrile group (—CN) at a chain-end thereof was finally synthesized.

Example 1-5

Synthesis of PAES-g-PEG-PYRTFSI Copolymer Having (-PYR+TFSI) at Chain-End

The PEGPYR was prepared from pyrridium and poly(ethylene glycol) methyl ether. The oxidative reaction was conducted using pyridine and acyl chlorides on methanol with trimethylsilyl iodide (Me3Si—I) as a catalyst at RT. Then, PEGPYR+Br was synthesized from Butyl bromide in acrylonitrile. After that, the ion exchange of PEGPYR+Br into PEGPYR+TFSI (PEGIL) was implemented by mixing it with LiTFSI in water until a phase sepration appears. The bottom phase was filted and freeze dried.

Example 1-6

Synthesis of PAES-g-2(PEG-PYRTFSI) Copolymer Having (-PYR+TFSI) at Chain-End

A PAES-g-2(PEG-PYRTFSI) copolymer having (-PYR+TFSI) at a chain-end was synthesized using PAES-2COOH, at least two poly(ethylene glycol: PEG) having a structure of HO-PEG-PYRTFSI and having a IL end group, catalysts N,N'-dicyclohexylcarbodiimide (DCC) and 4-dimethylaminopyridine (DMAP) and solvent dimethylformamide (DMF).

Example 2

Preparation of Solid Electrolyte Membrane

To prepare a solid electrolyte membrane including each of the copolymers prepared according to Example 1 of the present disclosure, first, an ionic liquid used for a solid electrolyte membrane was synthesized. The ionic liquid was synthesized by performing a following procedure.

First, we slowly dropped a second solution in which 1-iodobutane (TB) was dissolved in tetrahydrofuran (THF) as a solvent into a first solution prepared by dissolving 1-methylpyrrolidine (MePyr) in an ethyl acetate solvent. Thus, a mixed solution was prepared. The mixed solution was stirred at room temperature for 1 hour, and then heated at 50° C. for 10 hours, and then PYR14-I as a resulting white product was filtered, and was washed three times with ethyl acetate and then dried under vacuum and at room temperature for 2 days. Then, we dissolved the dried PYR14-I and LiTFSI in deionized water for ion exchange reaction. Then, when a mixed solution was separated into two phases, PYR14-TFSI as a lower portion was separated therefrom and was washed with cold deionized water to remove excess LiTFSI salt. Thereafter, a PYR14-TFSI product was freeze-dried for 3 days, and then 0.5M LiTFSI salt was added thereto to prepare PYR14-TFSI as an ionic liquid.

We dissolved each of the copolymers as prepared in Example 1 of the present disclosure and the ionic liquid (PYR14-TFSI) in a tetrahydrofuran (THF) solvent, and then cast each mixed solution onto a polytetrafluoroethylene (PTFE) dish, and dried the same to prepare a solid electrolyte membrane.

EXPERIMENTAL EXAMPLE

Experimental Example A

Copolymer Synthesis Identification $^1$H-NMR spectrum and FT-IR spectrum of each of the copolymers as synthesized according to Example 1 of the present disclosure were obtained via a nuclear magnetic resonance spectroscopy and a Fourier transform infrared spectroscopy to identify the synthesis of each of the copolymers synthesized according to Example 1 of the present disclosure. The identification results are shown in FIGS. 2A and 2B.

Figure 2A:
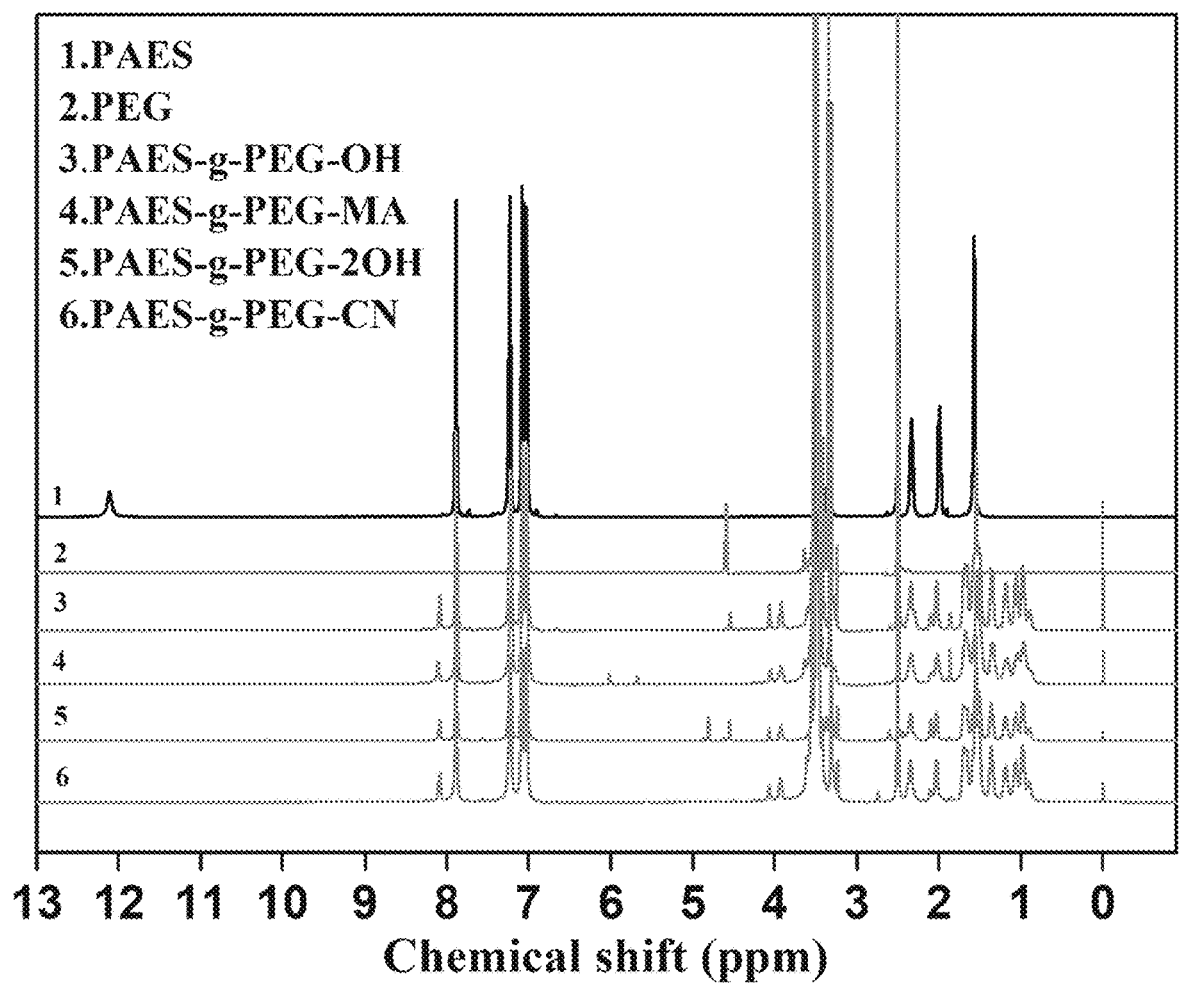
FIG. 2A shows $^1$H-NMR spectrum and FIG. 2B FT-IR spectrum of each of PAES-COOH main chain polymer, and PAES-g-PEG-OH, PAES-g-PEG-MA, PAES-g-PEGMA-2OH and PAES-g-PEG-CN copolymers as prepared according to Example 1 of the present disclosure.
Figure 2B:
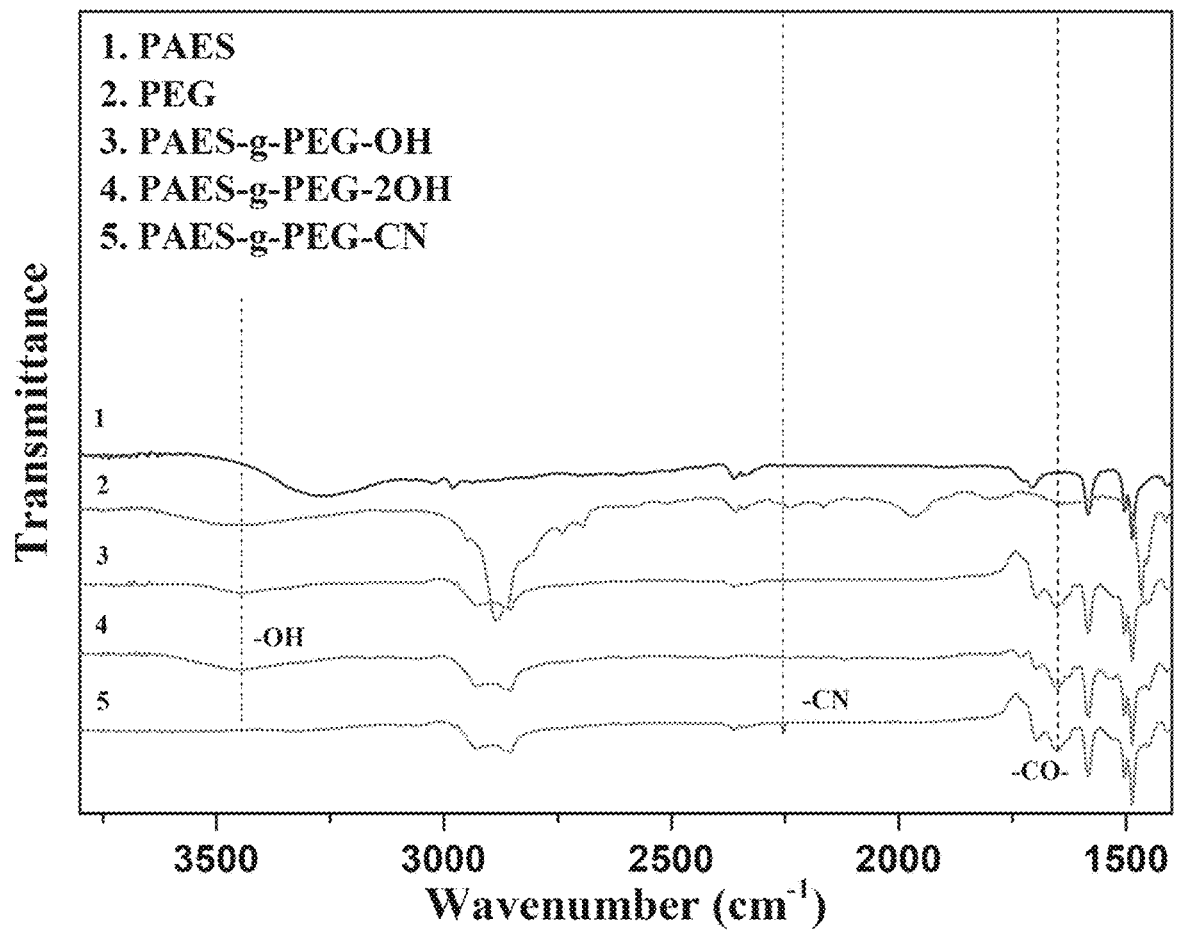
Figure 3A:
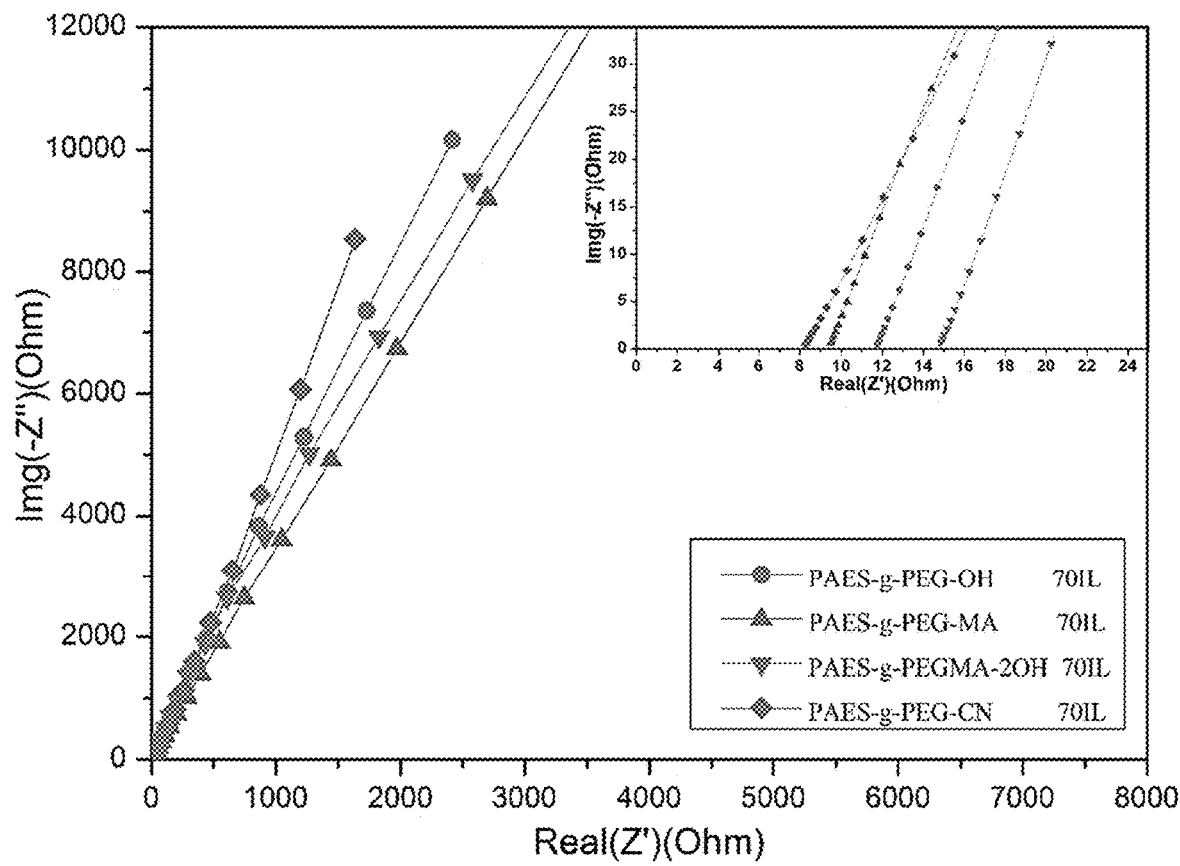
FIG. 3A shows Nyquist diagram.
Figure 3B:
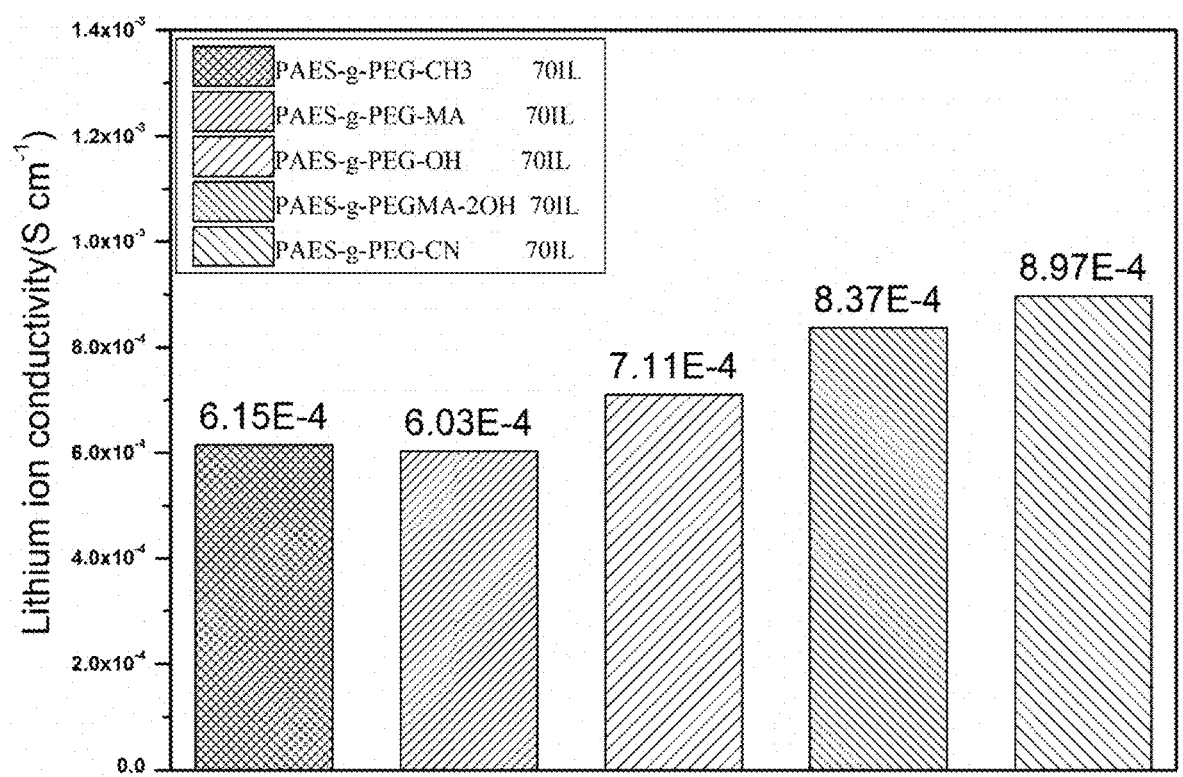
FIG. 3B shows lithium ion conductivity of a solid electrolyte membrane (containing 70wt % of ionic liquid) as prepared according to Example 2 of the present disclosure.
Figure 3C:
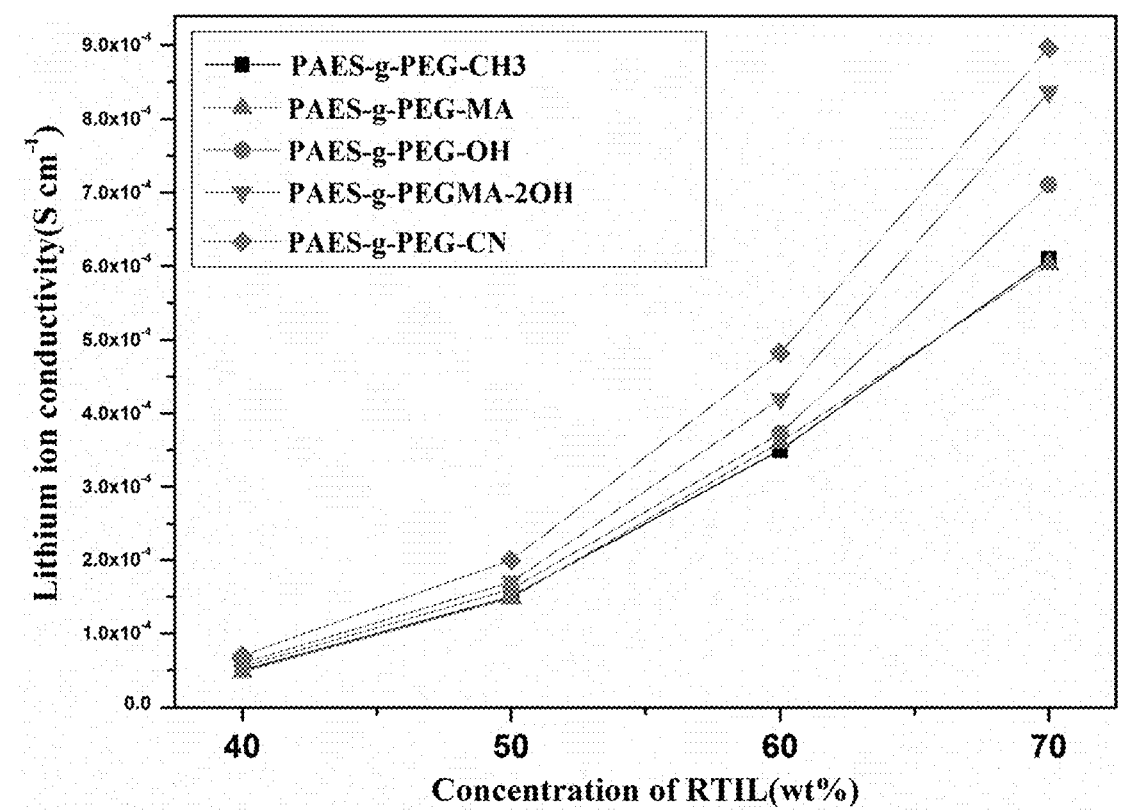
FIG. 3C shows a diagram for analyzing the lithium ion conductivity of the solid electrolyte membrane including PAES-g-PEG having each of various functional groups as a substituent at a chain-end thereof, and containing the ionic liquid at each of various weight percentage.
Figure 3D:
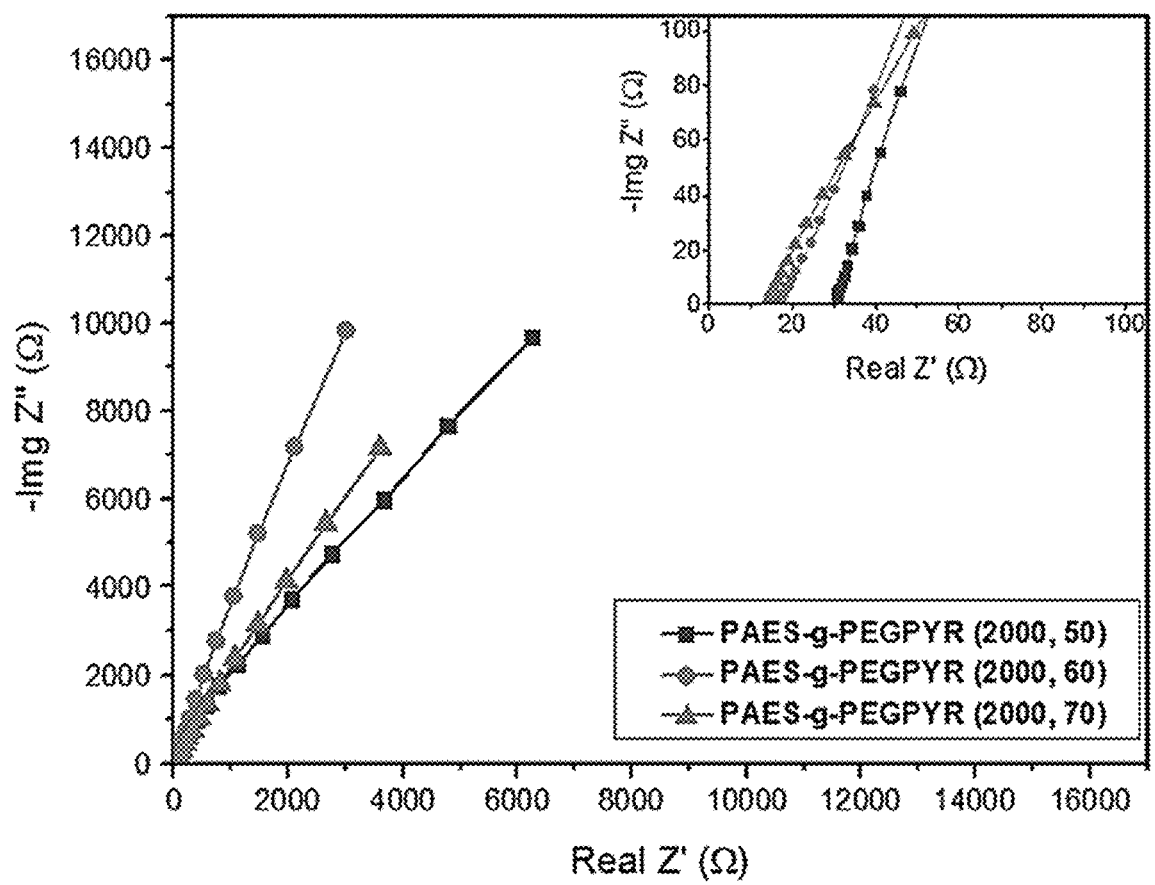
FIGS. 3D and 3E show Nyquist diagrams and FIGS. 3F and 3G show diagrams for analyzing the lithium ion conductivity of the solid electrolyte membrane including PAES-g-PEG-PYRTFSI and PAES-g-2(PEG-PYRTFSI).
Figure 3E:
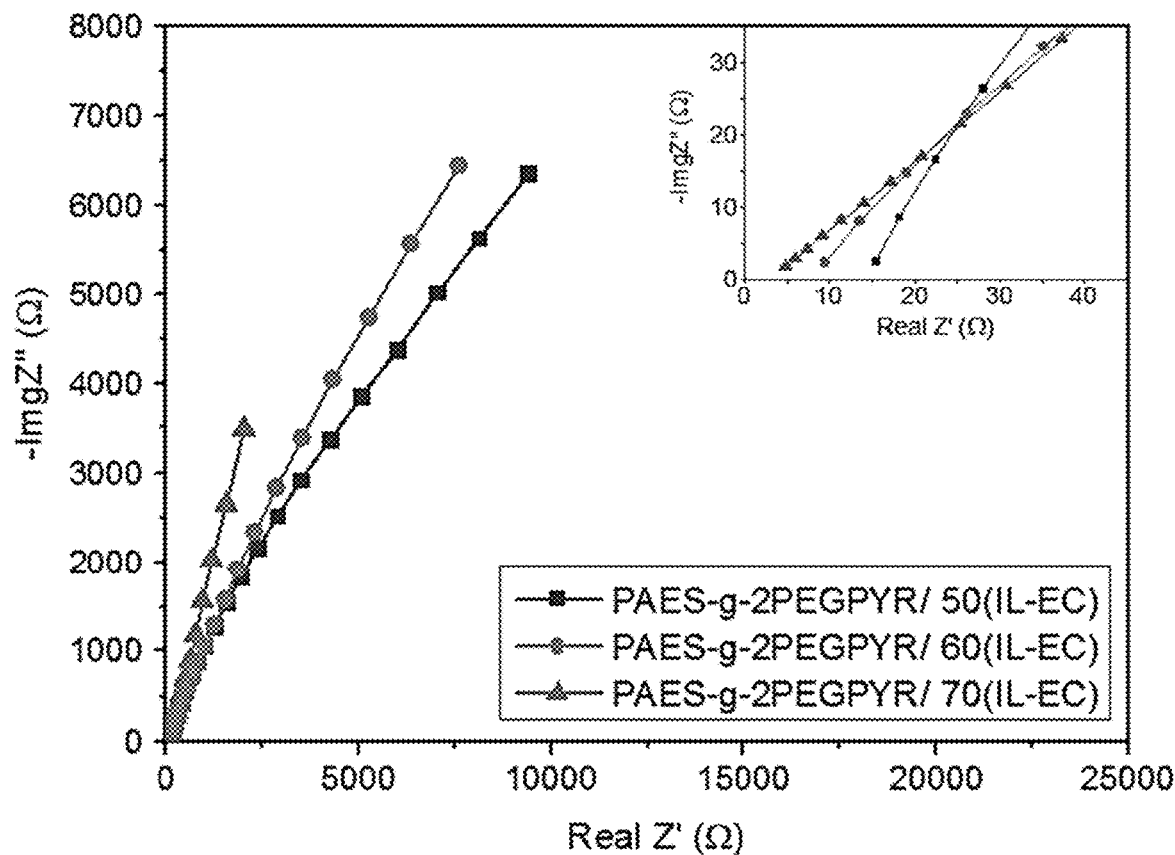
Figure 3F:
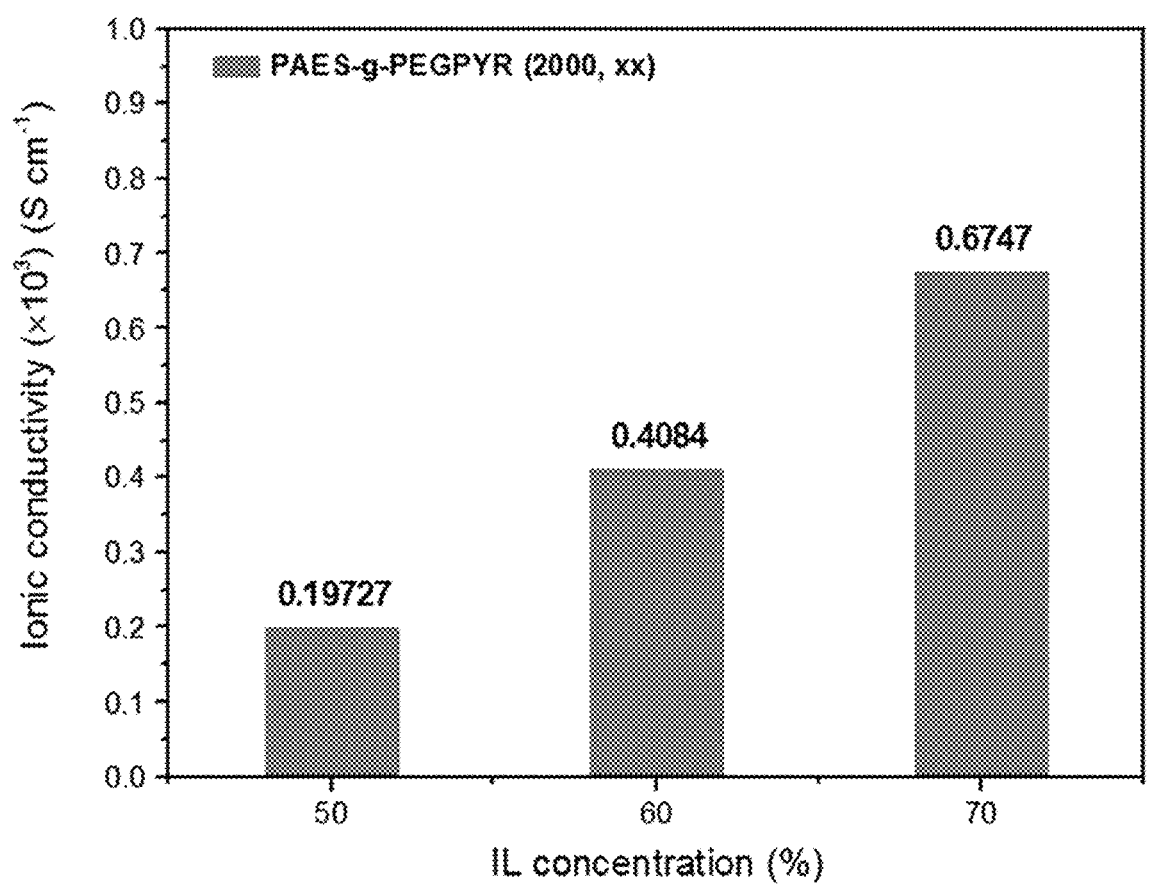
Figure 3G:
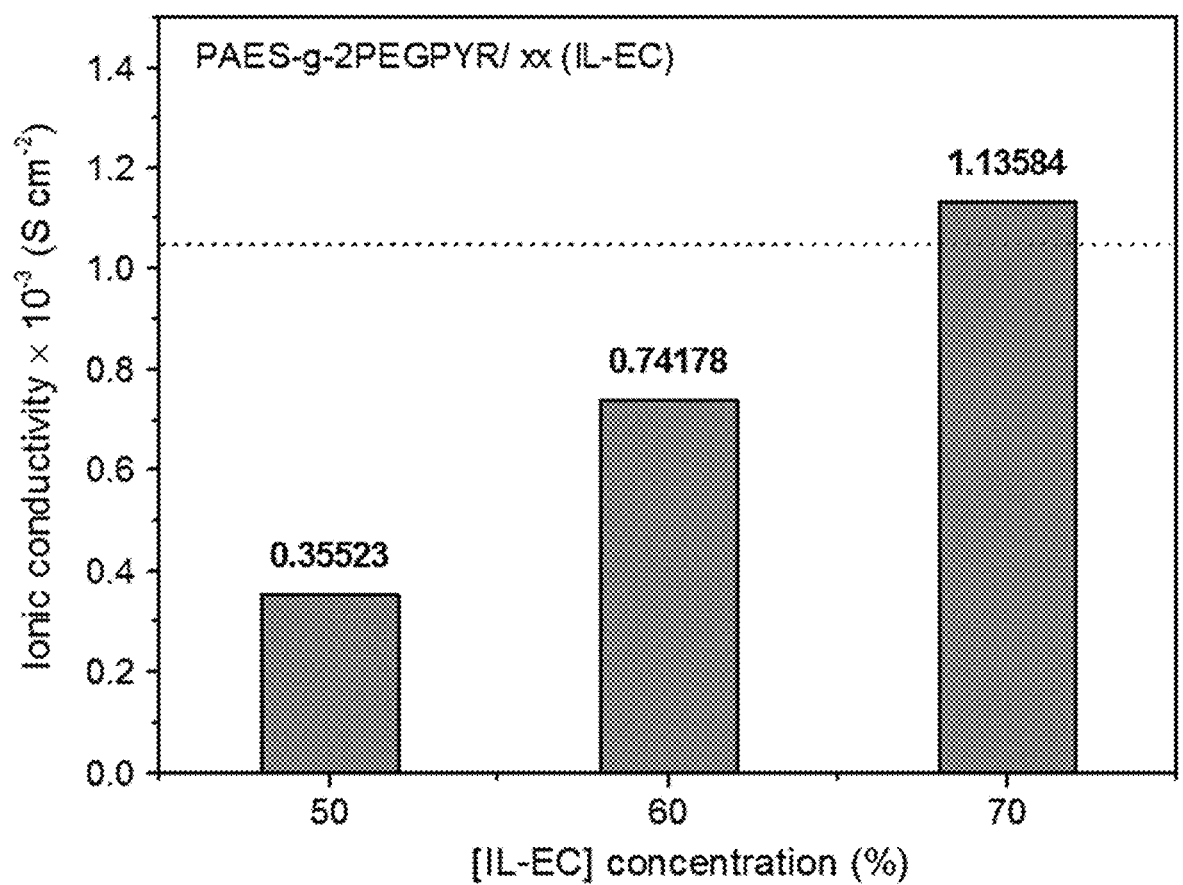

Referring to FIG. 2, it may be identified based on FIG. 2A that each of the copolymers synthesized according to the Examples of the present disclosure has the same peaks as those of PAES (black) and PEG (red), so that each of the copolymers including PAES and PEG was successfully synthesized. Similarly, based on FIG. 2B, it may be identified that each of the copolymers synthesized according to the Examples of the present disclosure has peaks similar to the peaks of PAES and PEG, and has a peak corresponding to each of a hydroxyl group (—OH), a nitrile group (—CN) and —CO— as the functional group as the substituent at the chain end of each copolymer. It may be seen that the functional group as a substituent was present at the chain-end of each of the copolymers synthesized according to the Examples of the present disclosure. Specifically, based on the —CO— peak, it may be identified that the COOH group of PAES and the OH group of PEG are esterified (changed to —CO group) to achieve the graft polymerization reaction of PAES and PEG.

Experimental Example B

Electrical Properties of Solid Electrolyte Membrane

In order to identify the electrical properties of the solid electrolyte membrane as prepared according to Example 2 of the present disclosure, the Nyquist diagram and lithium ion conductivity of each solid electrolyte membrane were identified. The identification results are shown in FIG. 3. In this connection, PAES-g-PEG-$CH_3$ means a copolymer in which PEG is grafted onto the PAES main chain while a functional group as a substituent is not present at the PEG chain-end.

Referring to FIG. 3, it may be identified based on FIGS. 3A, 3B, 3D and 3E that the solid electrolyte membrane according to the present disclosure has excellent lithium ion conductivity. This is because various chain-end functional groups act to promote dissociation of lithium salts, thereby increasing lithium ion transport. Further, based on the results of FIGS. 3C, 3F and 3G, it may be identified that the lithium ion conductivity increases as the weight percentage of the ionic liquid increases. It may be expected that this is because as the weight percentage of the ionic liquid increases, the crystallinity of the PEG chains decreases, so that lithium ions may be moved more easily.

Experimental Example C

Interfacial Resistance and Lithium Ion Transport Ability of Solid Electrolyte Membrane Since an interfacial resistance is related to the diffusion of lithium ions into the electrode, the interfacial resistance is a very important factor in the electrochemical properties of the battery. Therefore, lithium ion diffusion and interfacial resistance analysis of the solid electrolyte membrane as prepared according to Example 2 of the present disclosure was performed. The identification results are shown in FIG. 4. In this connection, PAES-g-PEG-$CH_3$ means a copolymer in which PEG is grafted onto the PAES main chain while a functional group as a substituent is not present at the PEG chain-end.

Figure 4A:
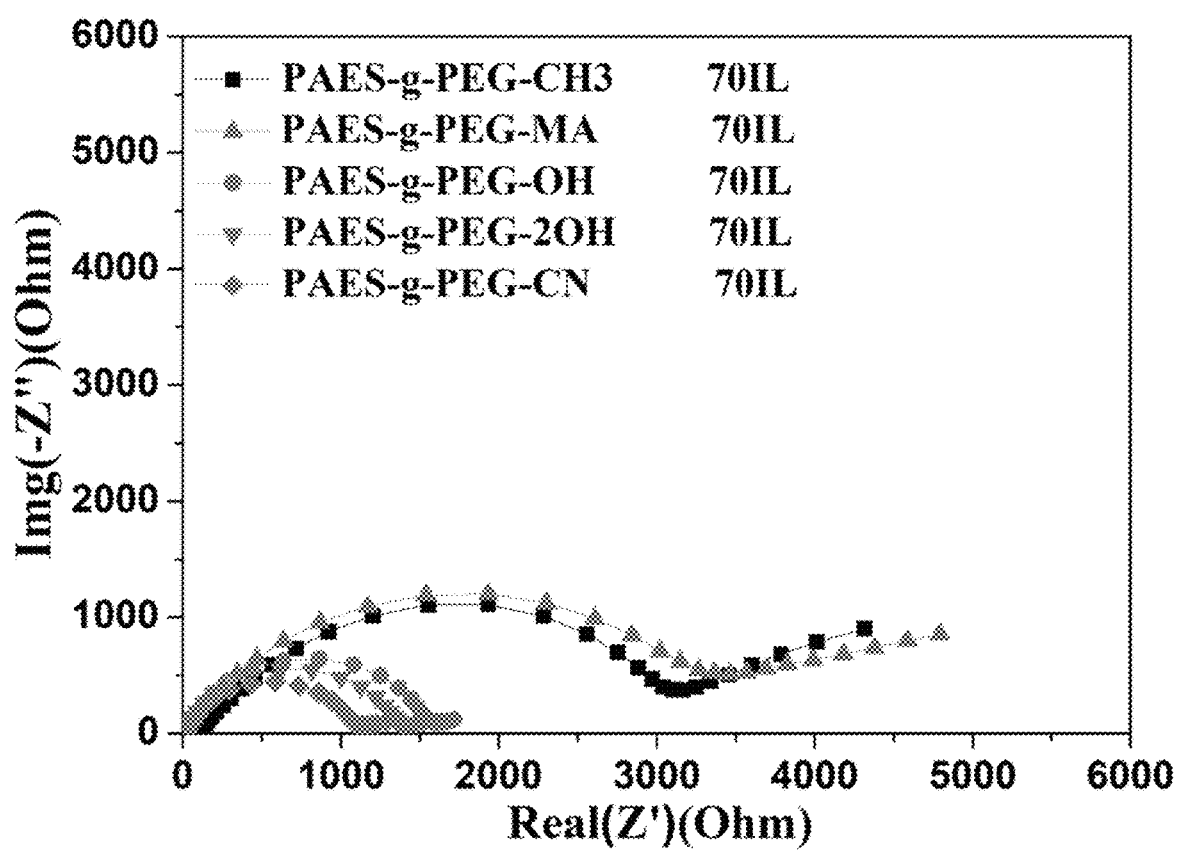
FIGS. 4A to 4C is a diagram for analyzing interfacial resistance and FIGS. 4D to 4F is a diagram for analyzing lithium ion transport ability of the solid electrolyte membrane as prepared according to Example 2 of the present disclosure.
Figure 4B:
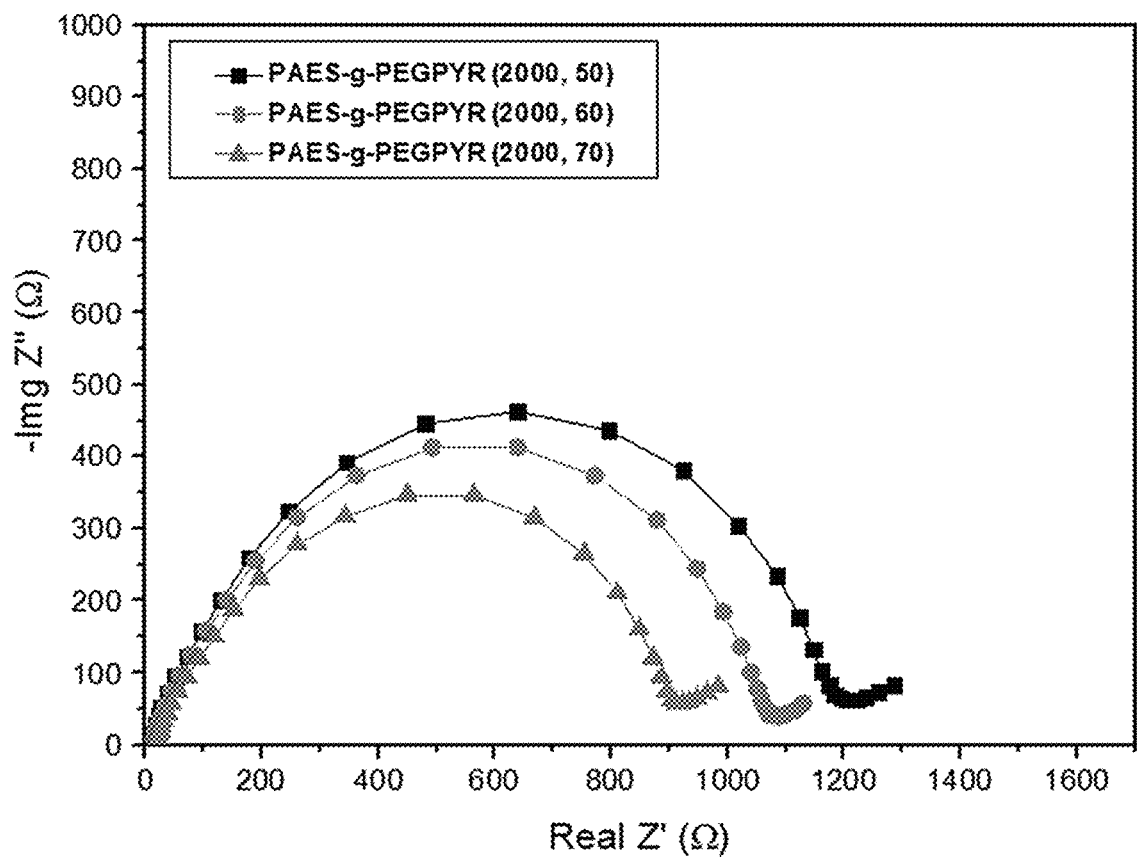
Figure 4C:
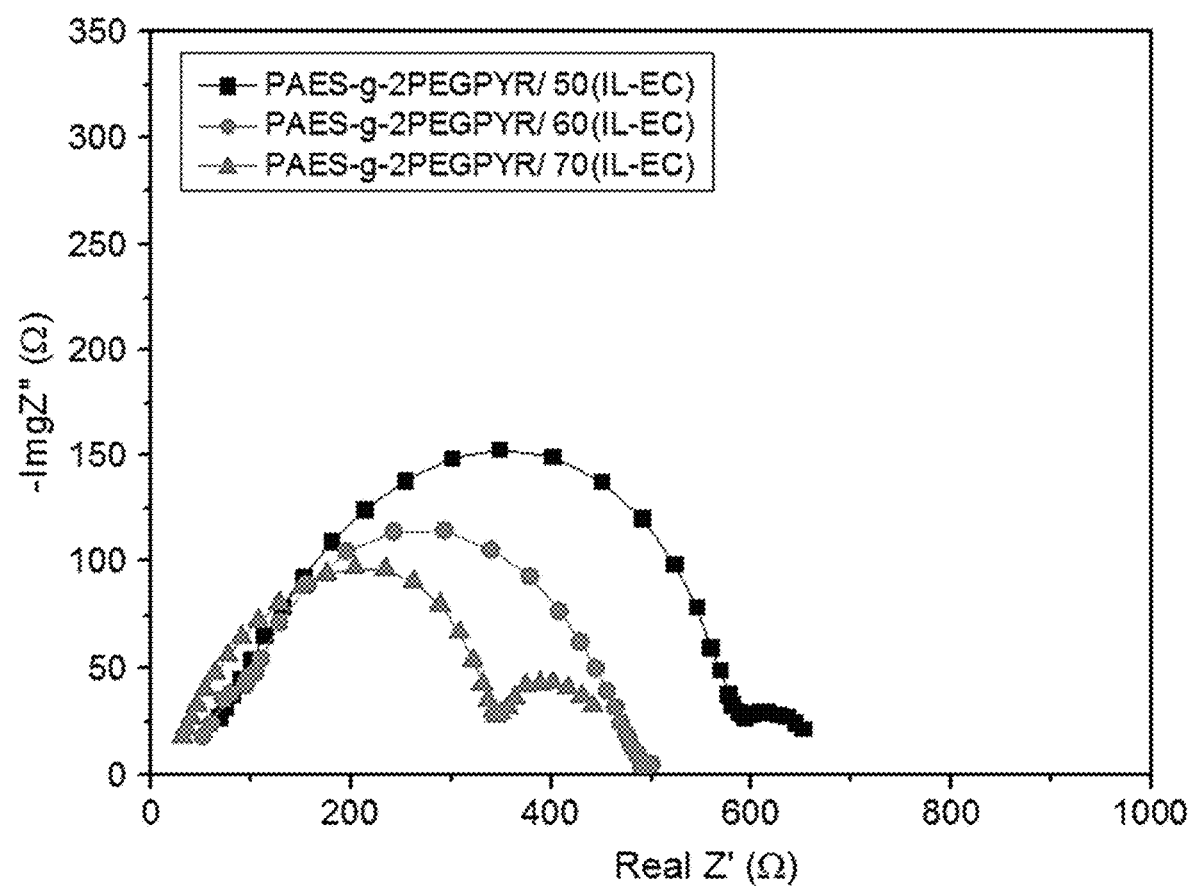
Figure 4D:
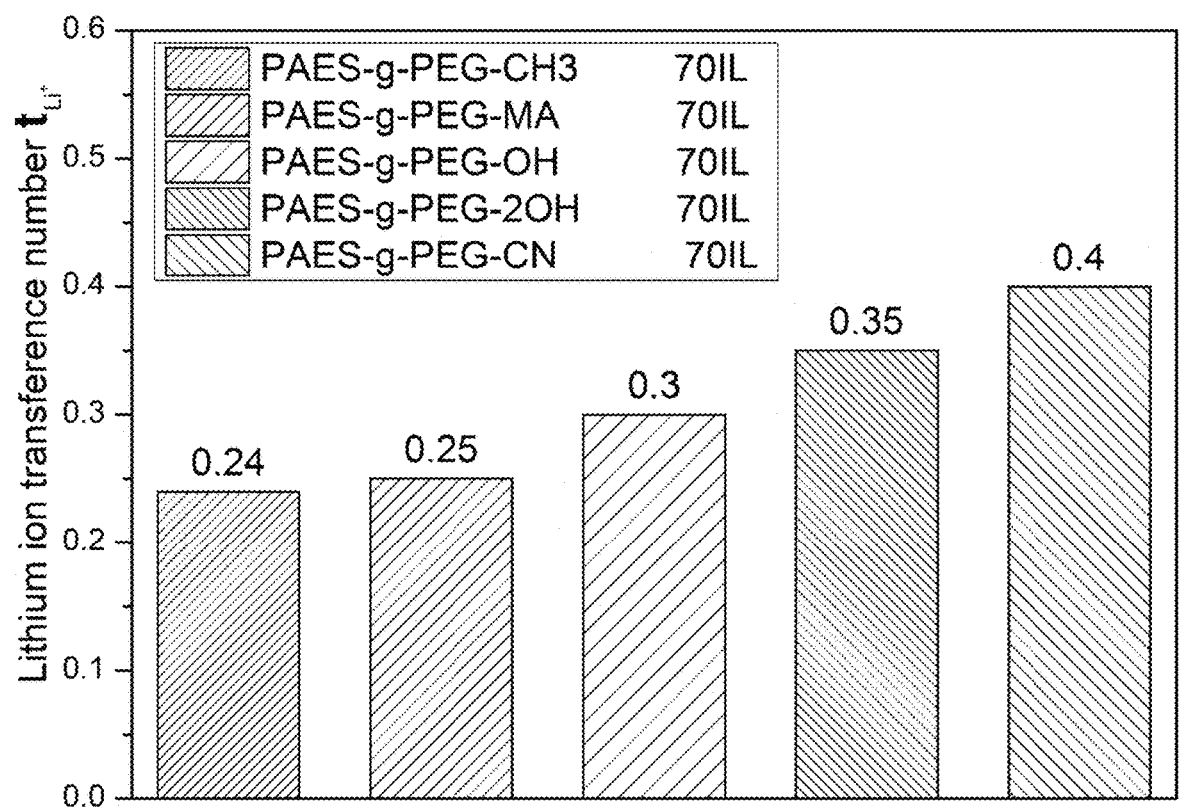
Figure 4E:
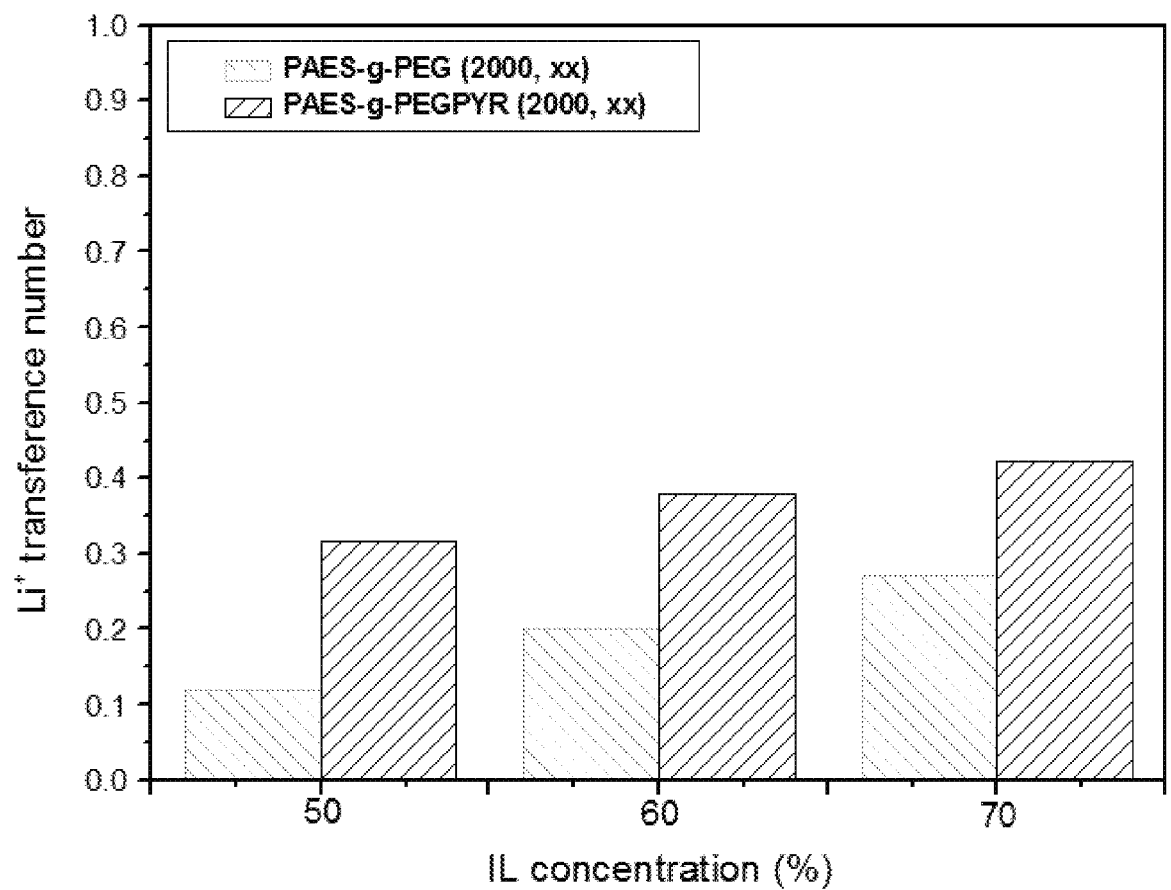
Figure 4F:
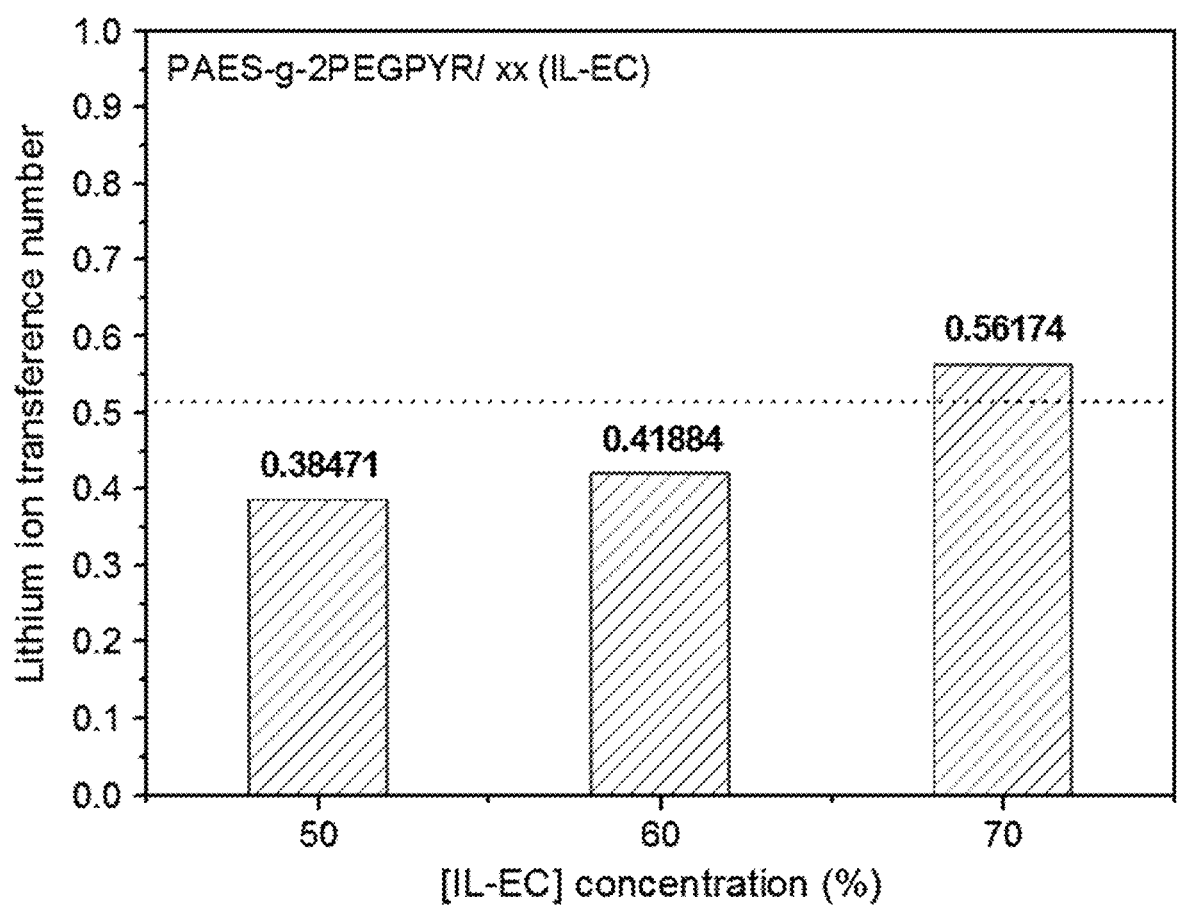

Referring to FIG. 4, based on FIGS. 4A to 4C the interface resistance graph, it may be identified that the solid electrolyte membrane according to the present disclosure has superior interfacial resistance compared to the prior art, and that the solid electrolyte membrane having the nitrile group (—CN) among the functional groups exhibits the lowest interfacial resistance with respect to the electrode. Similarly, based on FIGS. 4D to 4F the lithium ion transport ability graph shows that the solid electrolyte membrane including PAES-g-PEG having each of various chain-end functional groups had improved lithium ion transport ability. It may be expected that this is because the lithium ion mobility increases due to the interaction between the introduced chain-end functional group and the lithium ions.

Experimental Example D

Thermal Properties of Solid Electrolyte Membranes

To identify the thermal stability of each of the solid electrolyte membranes as prepared according to Example 2 of the present disclosure, the thermal properties thereof were analyzed via each of thermogravimetric analysis (TGA) and differential scanning calorimetry (DSC). The identification results are shown in FIG. 5.

Figure 5A:
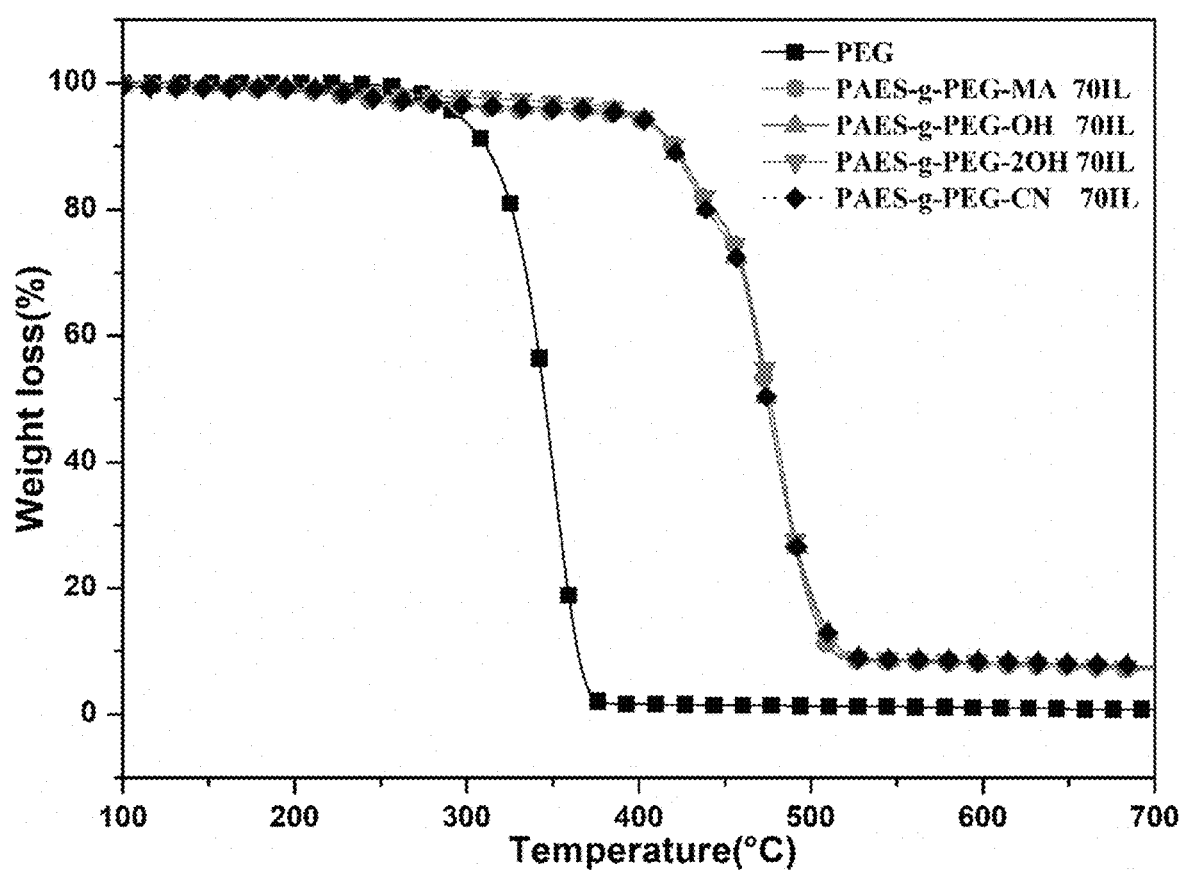
FIG. 5A is a diagram for analyzing thermogravimetric analysis (TGA) and FIG. 5B is a diagram for analyzing differential scanning calorimetry (DSC) of the solid electrolyte membrane as prepared according to Example 2 of the present disclosure.

Referring to FIG. 5, based on FIG. 5A, it may be identified that a weight of the solid electrolyte membrane having pure PEG and free of the functional group decreases at about 300° C., while a weight of the solid electrolyte membrane according to the present disclosure decreases at about 430° C. This thermal stability is due to the PAES main chain. It may be identified that the solid electrolyte membrane according to the present disclosure has better thermal stability than the prior art has. Thus, the possibility that the solid electrolyte membrane according to the present disclosure may be applied to a high-temperature system is identified.

Figure 5B:
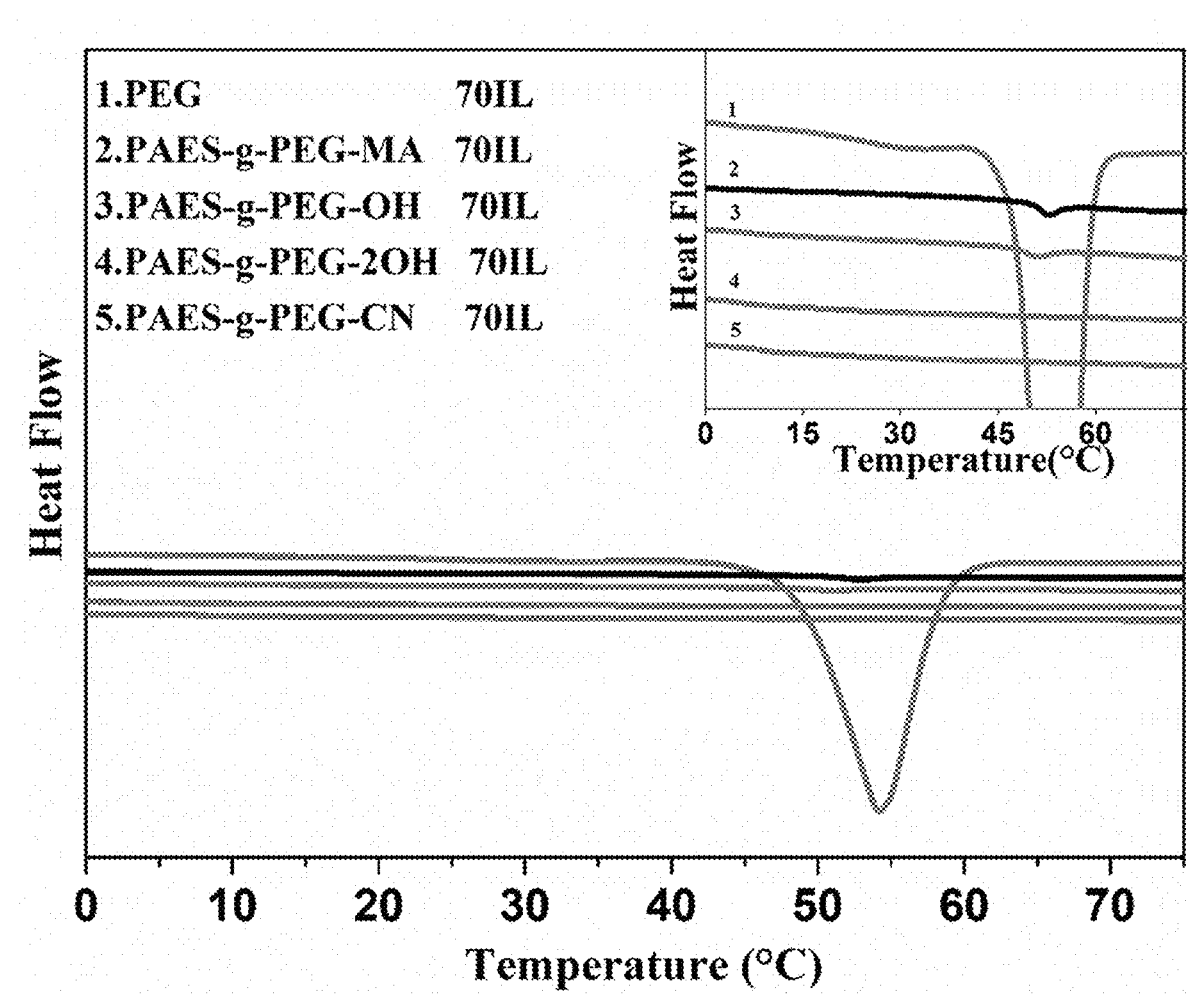

Further, based on FIG. 5B, it may be identified that the solid electrolyte membrane having pure PEG and free of the functional group exhibits a large melting peak at about 54° C., whereas the solid electrolyte membrane including PAES-g-PEG having each of various chain-end functional groups exhibits a fine melting peak. Specifically, in each of PAES-g-PEG-2OH and PAES-g-PEG-CN, almost no melting peak is observed. Thus, it may be seen that when the functional group as a substituent is present at the chain-end of PEG, the effect of reducing the crystallinity of the PEG phase may be provided.

Experimental Example E

Mechanical Properties of Solid Electrolyte Membrane

In order to identify the mechanical properties of the solid electrolyte membrane as prepared according to Example 2 of the present disclosure, each of a dimensional change test and a bending test thereof based on a temperature was performed. The identification results are shown in FIG. 6.

Figure 6A:
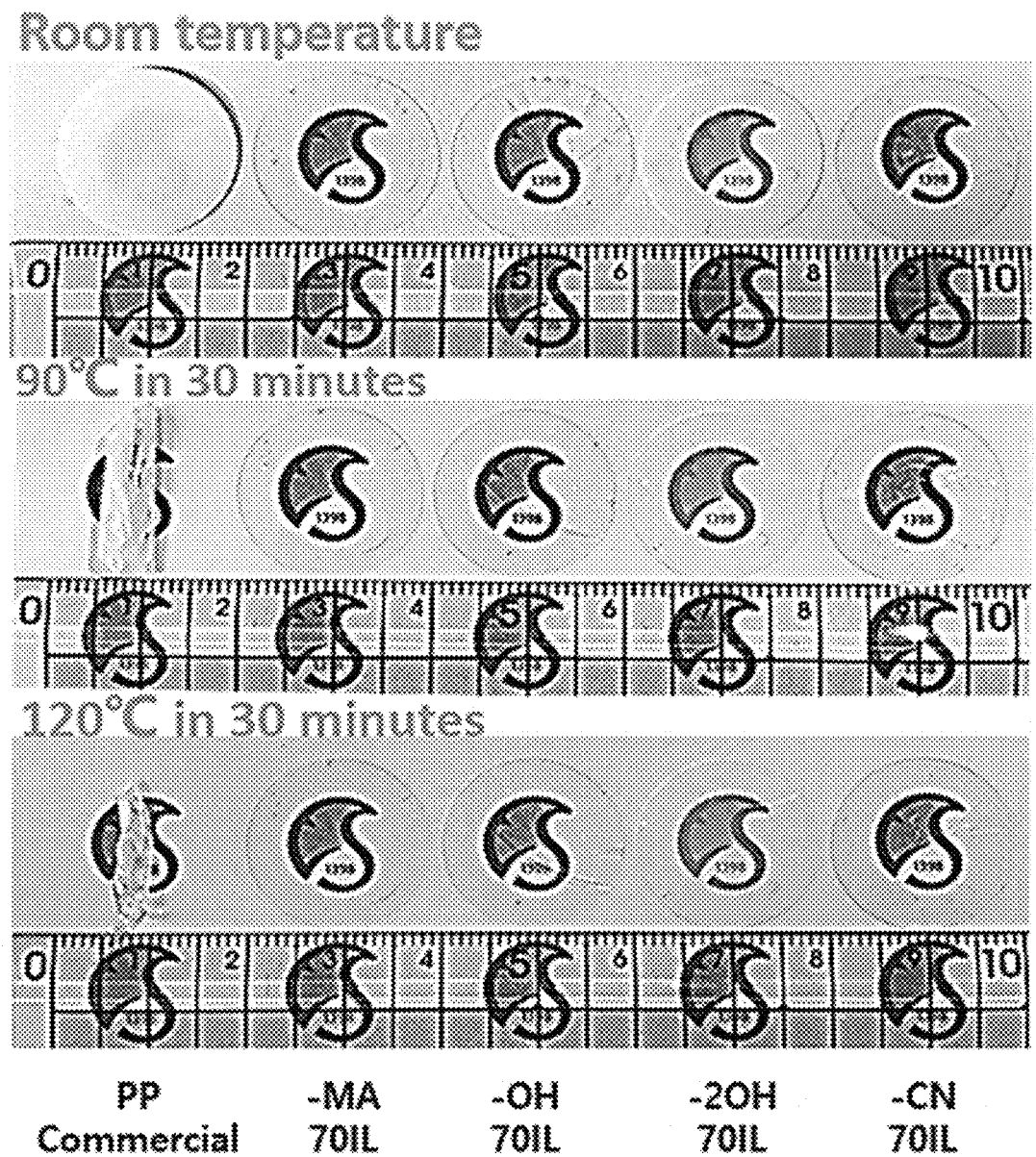
FIG. 6A is a thermal shrinkage of the solid electrolyte membrane (containing 70% wt of the ionic liquid) as prepared according to Example 2 of the present disclosure.

Referring to FIG. 6, based on FIG. 6A, it may be seen that the conventional separator made of polypropylene (PP) has thermal shrinkage starting at 90° C. and has completely deteriorated at 120° C. On the contrary, the solid electrolyte membrane according to the present disclosure maintains its original state and has little change in a dimension. It may be interpreted that this is because the PAES main chain of the solid electrolyte membrane according to the present disclosure has a high melting point.

Figure 6B:
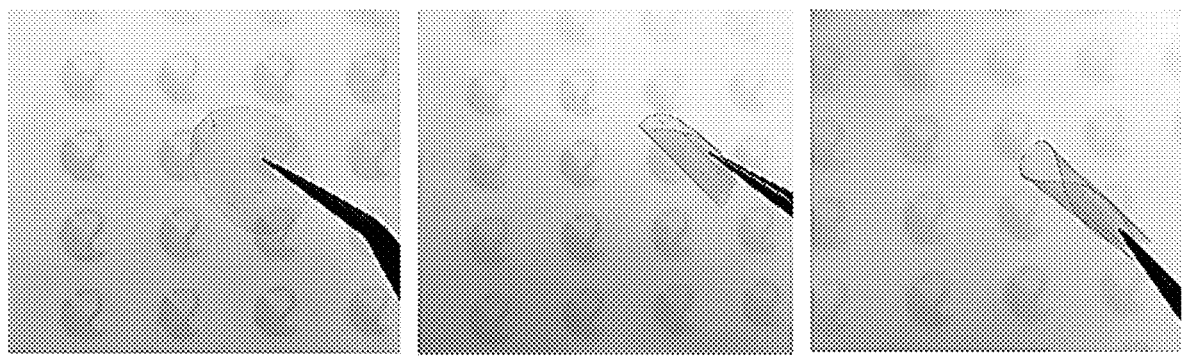
FIG. 6B is a bent image of the PAES-g-PEG-CN based solid electrolyte membrane.

Further, based on FIG. 6B, it may be identified that mechanical defects do not occur in the solid electrolyte membrane according to the present disclosure when the solid electrolyte membrane according to the present disclosure is folded in a half manner and is rolled. Thus, it may be seen that the solid electrolyte membrane according to the present disclosure has excellent flexibility.

Experimental Example F

Electrochemical Properties of Solid Electrolyte Membranes

In order to identify the electrochemical properties of the solid electrolyte membrane as prepared according to Example 2 of the present disclosure, analysis of a discharge capacity indicating the charge/discharge characteristics of each of batteries having a structure of $LiCoO_2$/solid electrolyte membrane/Li was performed. The identification results are shown in FIG. 7.

Figure 7:
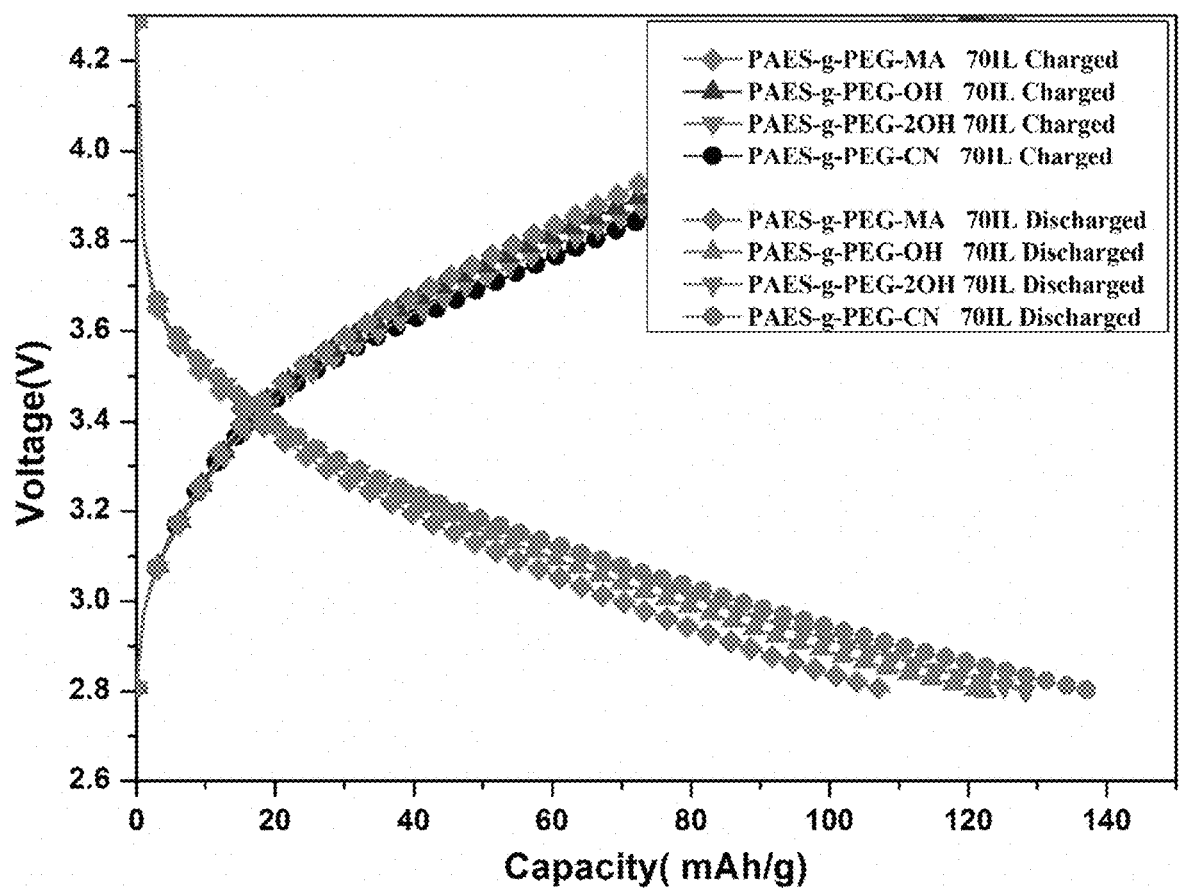
FIG. 7 is a diagram for analyzing charge/discharge characteristics of a battery composed of a lithium cobalt oxide ($LiCoO_2$)/solid electrolyte membrane/lithium (Li) as manufactured using the solid electrolyte membrane as prepared according to Example 2 of the present disclosure.

Referring to FIG. 7, it may be identified that among PAES-g-PEGs having various chain-end functional groups, PAES-g-PEG having a nitrile group (—CN) having a large polarity as a substituent at the chain-end thereof exhibits the largest discharge capacity. It may be interpreted that this is because the solid electrolyte membrane including PAES-g-PEG-CN has the highest lithium ion conductivity and lithium ion transport ability.

Based on the results of Experimental Example F, the cycle stability of the solid electrolyte membrane including PAES-g-PEG-CN having the nitrile group (—CN) as a substituent at the chain-end thereof was measured.

Experimental Example G

Figure 8:
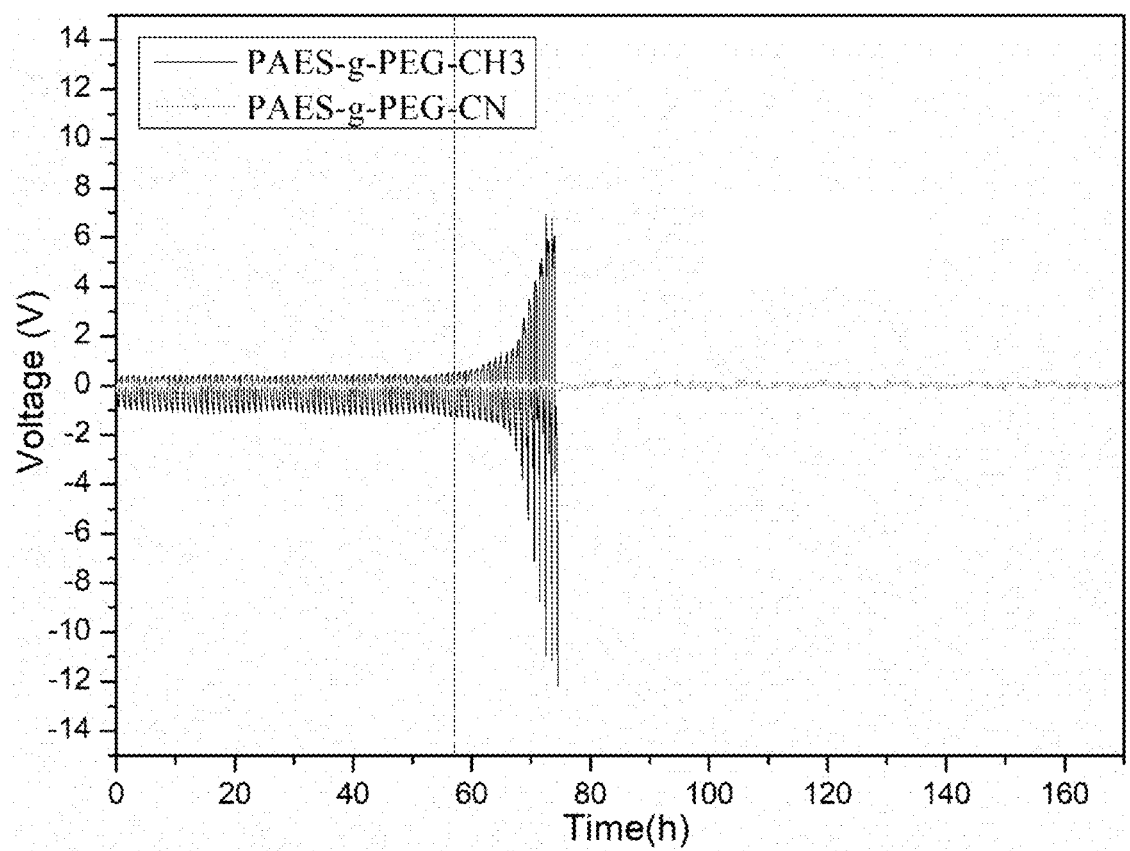
FIG. 8 is a diagram for comparing cycle stability of the PAES-g-PEG-CN based solid electrolyte membrane having the nitrile group at the substituent at the chain-end thereof as prepared according to one example of the present disclosure with that of pure PAES-g-PEG-$CH_3$ based solid electrolyte membrane. In this connection, a current density is 0.25 mA $cm^{-2}$.

Cycle Stability of Solid Electrolyte Membrane Including PAES-g-PEG-CN Having Nitrile Group (—CN) as Substituent at Chain-End Thereof A cycle profile of the solid electrolyte membrane including PAES-g-PEG-CN having the nitrile group (—CN) as a substituent at the chain-end thereof according to the present disclosure was analyzed. The cycle profile of a solid electrolyte membrane having pure PEG and free of the functional group as a comparative example was also analyzed. The identification results are shown in FIG. 8. For reference, the cycle profile shows a result of each battery having a structure of $LiCoO_2$/solid electrolyte membrane/Li.

Referring to FIG. 8, the battery including the solid electrolyte membrane using PAES-g-PEG-CN does not have a short circuit after a use time duration of 160 hours and exhibits low overvoltage and stable voltage profile. In contrast, the battery including the solid electrolyte membrane using PAES-g-PEG-$CH_3$ free of the chain-end functional group exhibits high overvoltage, short circuit and short lifespan.

It will be understood that although the above disclosure has been described with reference to the preferred embodiment of the present disclosure, those skilled in the art may achieve modifications and changes thereto within a range that does not deviate from the spirit and region of the present disclosure as described in the following claims.

What is claimed is:

1. A copolymer comprising:
   a compound selected from a group consisting of compounds respectively represented by following Chemical Formulas 1-1 to 1-4; and
   a functional group as a substituent at a chain-end of the compound, wherein the functional group includes one selected from a group consisting of a hydroxyl group (—OH), methacrylate (-MA), a double hydroxyl group (-2OH), and a nitrile group (—CN):

[Chemical Formula 1-1]

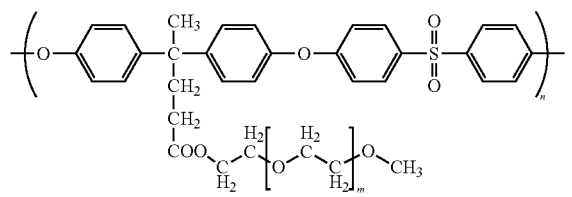

[Chemical Formula 1-2]

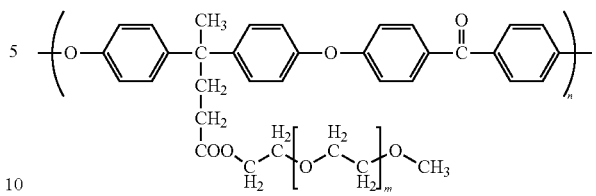

[Chemical Formula 1-3]

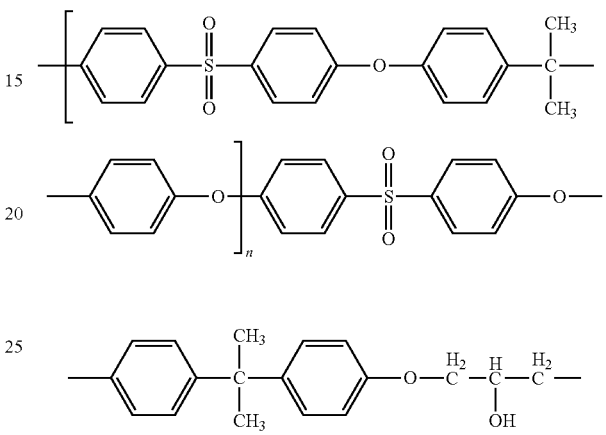

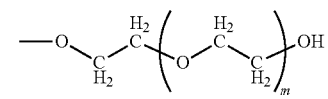

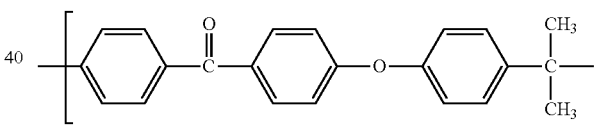

[Chemical Formula 1-4]

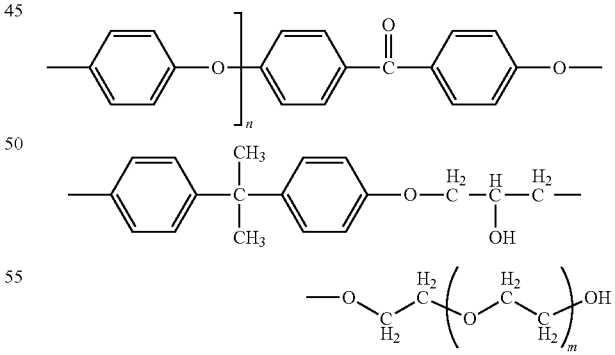

wherein in each of the Chemical Formulas 1-1 to 1-4, each of m and n independently represents an integer of 1 or greater.

2. The copolymer of claim 1, wherein when the functional group is the hydroxyl group (—OH), the copolymer is represented by one selected from a group consisting of following Chemical Formulas 2-1 to 2-4:

[Chemical Formula 2-1]

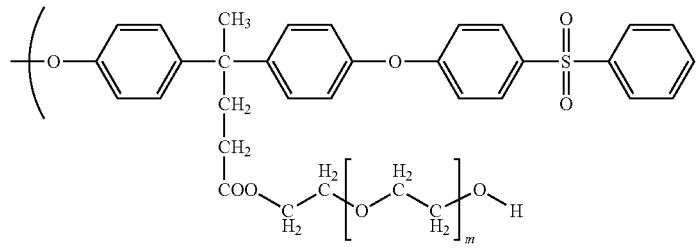

[Chemical Formula 2-2]

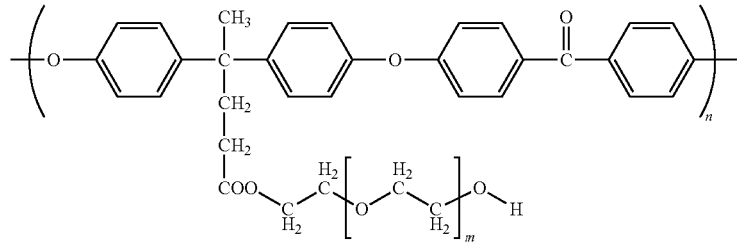

[Chemical Formula 2-3]

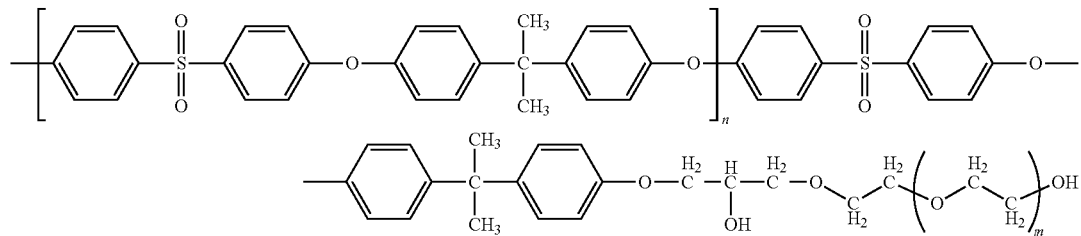

[Chemical Formula 2-4]

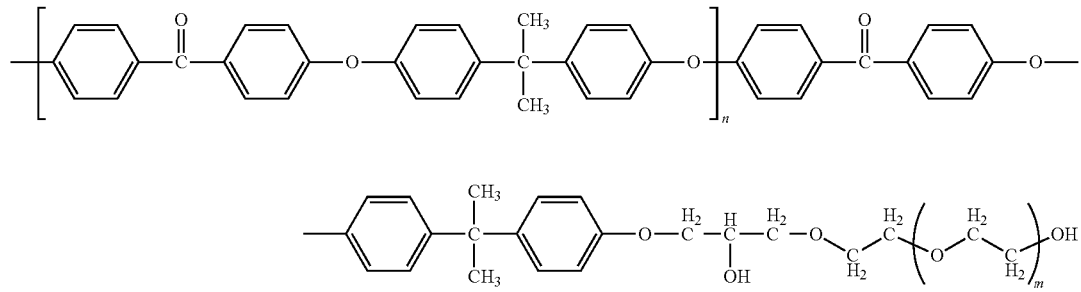

wherein in each of the Chemical Formulas 2-1 to 2-4, each of m and n independently represents an integer of 1 or greater.

3. The copolymer of claim 1, wherein when the functional group is the methacrylate (-MA), the copolymer is represented by one selected from a group consisting of following Chemical Formulas 3-1 to 3-4:

[Chemical Formula 3-1]

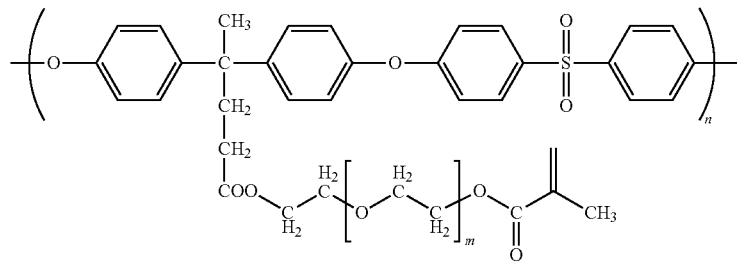

[Chemical Formula 3-2]

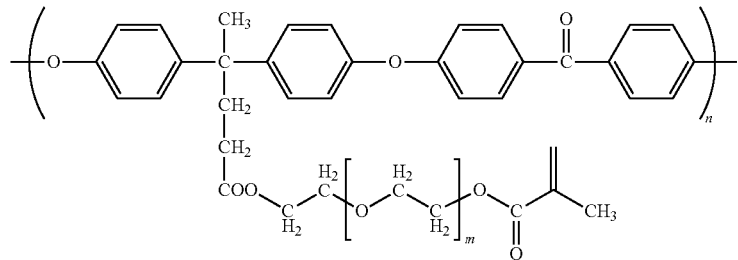

[Chemical Formula 3-3]

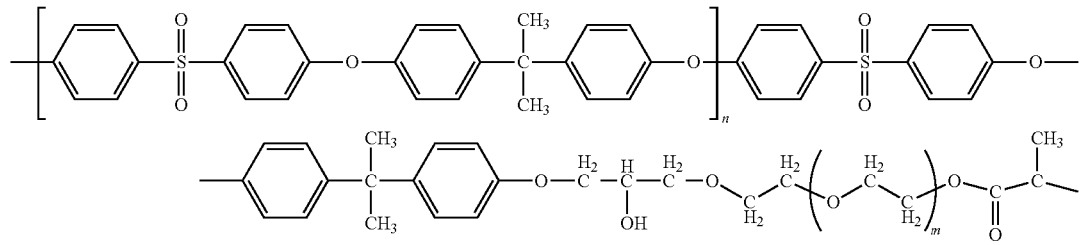

[Chemical Formula 3-4]

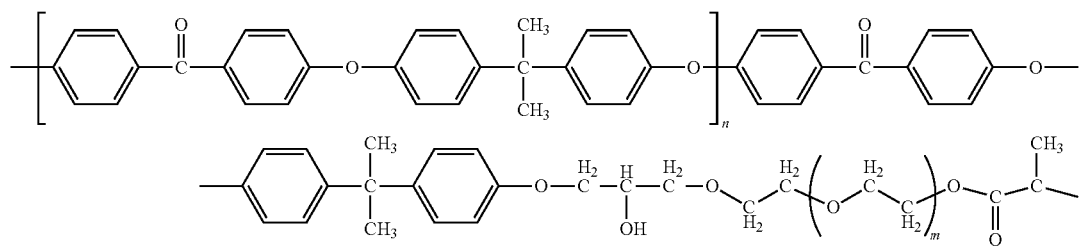

wherein in each of the Chemical Formulas 3-1 to 3-4, each of m and n independently represents an integer of 1 or greater.

4. The copolymer of claim 1, wherein when the functional group is the double hydroxyl group (-2OH), the copolymer is represented by one selected from a group consisting of following Chemical Formulas 4-1 to 4-4:

[Chemical Formula 4-1]

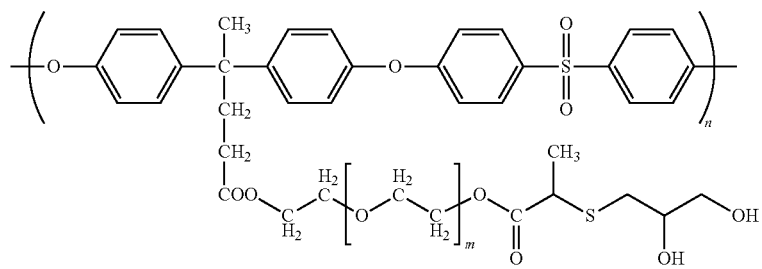

[Chemical Formula 4-2]

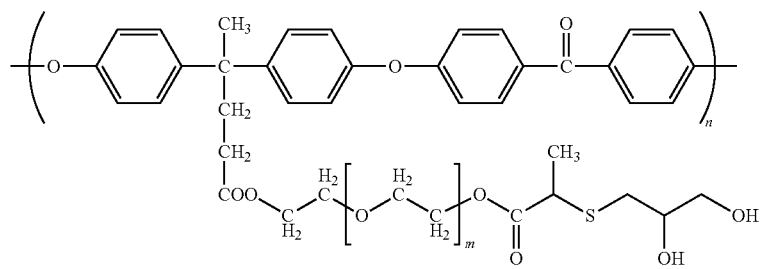

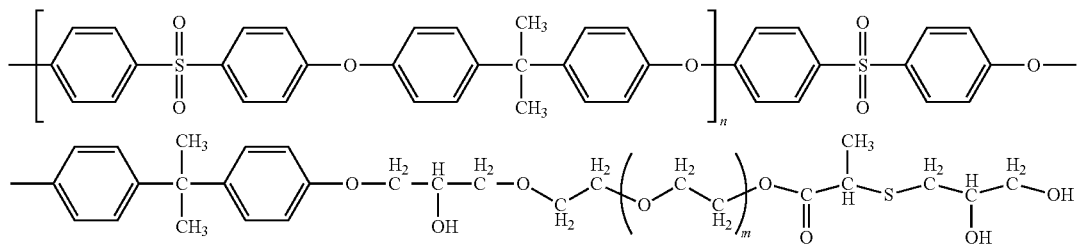

[Chemical Formula 4-3]

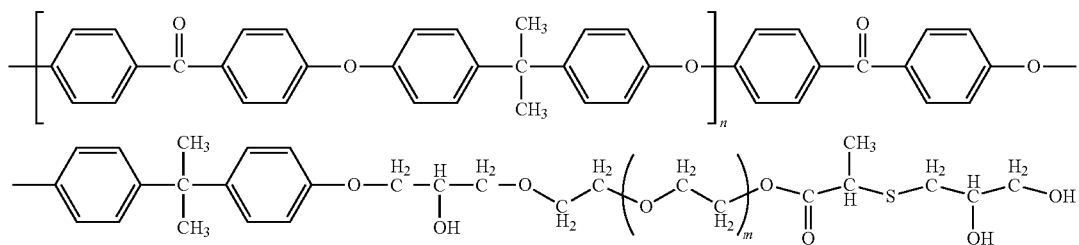

[Chemical Formula 4-4]

wherein in each of the Chemical Formulas 4-1 to 4-4, each of m and n independently represents an integer of 1 or greater.

5. The copolymer of claim 1, wherein when the functional group is the nitrile group (—CN), the copolymer is represented by one selected from a group consisting of following Chemical Formulas 5-1 to 5-4:

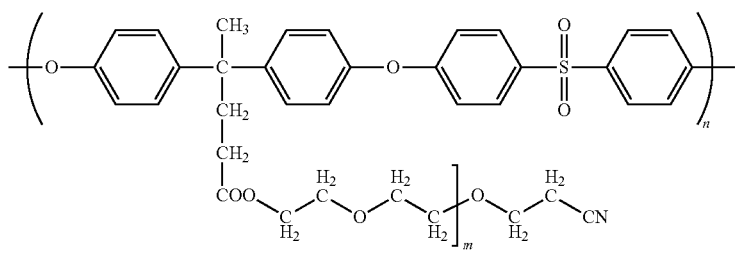

[Chemical Formula 5-1]

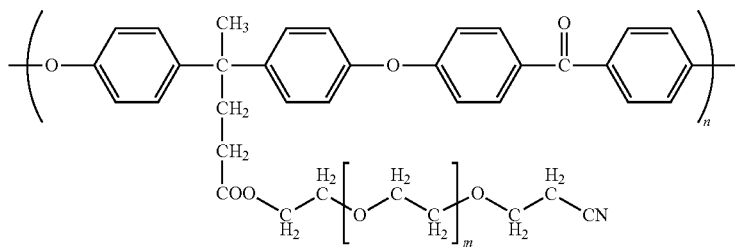

[Chemical Formula 5-2]

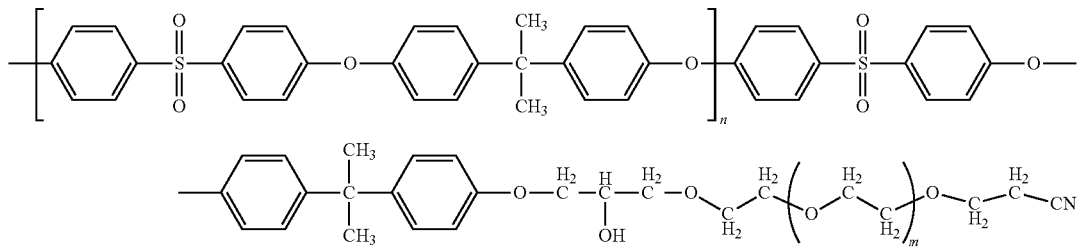

[Chemical Formula 5-3]

[Chemical Formula 5-4]

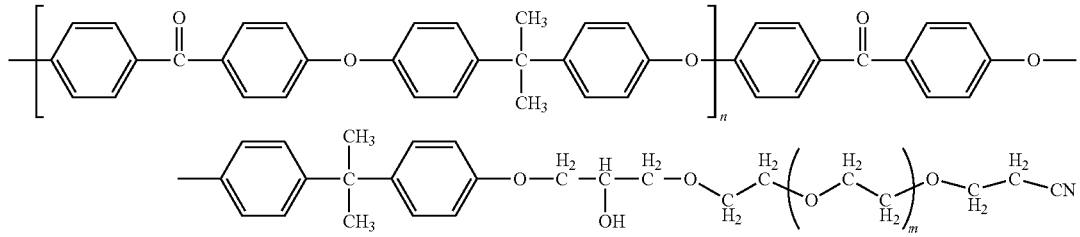

wherein in each of the Chemical Formulas 5-1 to 5-4, each of m and n independently represents an integer of 1 or greater.

6. An electrolyte membrane for a secondary battery, wherein the electrolyte membrane includes:
the copolymer of claim 1; and
an ionic liquid.

7. The electrolyte membrane of claim 6, wherein the ionic liquid includes one selected from a group consisting of PYR14-TFSI, EMI-TFSI, EMI-BF4, EMI-FSI, MPP-TFSI, MBP-TFSI, and BMI-TFSI.

8. The electrolyte membrane of claim 6, wherein a weight percentage of the ionic liquid is in a range of 40 to 70% of a total weight of the membrane.

9. A method for preparing an electrolyte membrane for a secondary battery of claim 6, wherein the method comprises:

a first step of preparing the copolymer of claim 1;
a second step of dissolving the copolymer and an ionic liquid in a solvent to prepare a mixed solution; and
a third step of casting and drying the mixed solution.

10. The method of claim 9, wherein the ionic liquid includes one selected from a group consisting of PYR14-TFSI, EMI-TFSI, EMI-BF4, EMI-FSI, MPP-TFSI, MBP-TFSI, and BMI-TFSI.

11. The method of claim 9, wherein the organic solvent is tetrahydrofuran (THF).

12. The method of claim 9, wherein the second step is carried out such that a weight percentage of the ionic liquid is in a range of 40 to 70% of a total weight of the membrane.

* * * * *